US012454113B2

(12) United States Patent
Ohnishi et al.

(10) Patent No.: US 12,454,113 B2
(45) Date of Patent: Oct. 28, 2025

(54) BAG MAKING APPARATUS AND BAG MAKING METHOD

(71) Applicant: Totani Corporation, Kyoto (JP)

(72) Inventors: Yuji Ohnishi, Kyoto (JP); Toshiki Nagasawa, Kyoto (JP)

(73) Assignee: Totani Corporation, Kyoto (JP)

(*) Notice: Subject to any disclaimer, the term of this patent is extended or adjusted under 35 U.S.C. 154(b) by 57 days.

(21) Appl. No.: 17/913,232

(22) PCT Filed: Feb. 10, 2021

(86) PCT No.: PCT/JP2021/005084

§ 371 (c)(1),
(2) Date: Sep. 21, 2022

(87) PCT Pub. No.: WO2021/210253

PCT Pub. Date: Oct. 21, 2021

(65) Prior Publication Data

US 2023/0166476 A1 Jun. 1, 2023

(30) Foreign Application Priority Data

Apr. 17, 2020 (JP) ................................ 2020-073903

(51) Int. Cl.
*B31B 70/18* (2017.01)
*B31B 70/10* (2017.01)
(Continued)

(52) U.S. Cl.
CPC .............. *B31B 70/18* (2017.08); *B31B 70/10* (2017.08); *B31B 2155/001* (2017.08); *B31B 2160/20* (2017.08)

(58) Field of Classification Search
CPC ..... B31B 70/18; B31B 70/10; B31B 2160/20; B31B 2155/001; B31B 70/266; B31B 70/644; B31B 70/16; B31B 2155/002
(Continued)

(56) References Cited

U.S. PATENT DOCUMENTS

2005/0272583 A1* 12/2005 Totani ..................... B31B 70/00 493/162
2011/0039676 A1* 2/2011 Totani ................... B31B 70/645 493/227
2022/0194045 A1 6/2022 Ohnishi et al.

FOREIGN PATENT DOCUMENTS

CN 113853295 A 12/2021
EP 2279857 A1 2/2011
(Continued)

*Primary Examiner* — Sameh Tawfik
(74) *Attorney, Agent, or Firm* — NovoTechIP Internatioal PLLC

(57) ABSTRACT

First and second panel webs are superposed on each other and fed in their longitudinal direction. After a side gusset is temporarily fixed to the second panel web, the side gusset is divided by a dividing device to form a pair of open edges. The open edges are aligned with a line of weakness of the first panel web when the first and second panel webs are superposed on each other. The side gusset is temporarily sealed to the first and second panel webs by a temporary seal device to form temporary sealed sections. The first panel web is guided to be divided along its line of weakness and to be folded on the sides of its division edges. This guiding of the panel web and the temporary sealed sections cause the side gusset to be opened at the open edges to form open surfaces. An end face web is then disposed on the panel web to be superposed on folded parts of the panel web and the open surfaces of the side gusset.

8 Claims, 22 Drawing Sheets

(51) Int. Cl.
*B31B 155/00* (2017.01)
*B31B 160/20* (2017.01)

(58) Field of Classification Search
USPC .......................................................... 493/227
See application file for complete search history.

(56) References Cited

FOREIGN PATENT DOCUMENTS

| | | | | | |
|---|---|---|---|---|---|
| JP | 3655627 | B2 | | 6/2005 | |
| JP | 2010036587 | A | | 2/2010 | |
| JP | 5584815 | B1 | * | 9/2014 | |
| JP | 2015123620 | A | | 7/2015 | |
| JP | 2018144363 | A | | 9/2018 | |
| WO | 2009131214 | A1 | | 8/2011 | |
| WO | WO-2020235188 | A1 | * | 11/2020 | ............. B31B 70/10 |

* cited by examiner

BAG MAKING APPARATUS AND BAG MAKING METHOD

TECHNICAL FIELD

The present application relates to a bag making apparatus and a bag making method for making bags each with an end face part.

BACKGROUND

A bag such as a plastic bag includes, for example, panel parts, side gusset parts and an end face part. The end face part may be a bottom face part, in particular a bottom gusset part. This kind of bag can be called a square bottom bag (or flat bottom bag). Patent documents 1 and 2 disclose bag making apparatuses for making such bags.

A bag making apparatus, for example, superposes two panel webs on each other and feeds them in their longitudinal direction. The bag making apparatus incorporates side gussets and an end face web (bottom gusset web) into the panel webs. The bag making apparatus heat-seals the panel webs, the side gussets and the end face web. The bag making apparatus cross-cuts the panel webs, the side gussets and the end face web in the width direction of the panel webs, thereby making bags. The bag making apparatus forms the panel parts from the panel webs, the side gusset parts from the side gussets, and the end face part from the end face web.

Patent document 1 discloses two types of the bag making apparatuses. One of the bag making apparatuses makes a bag per every cross-cutting. The other bag making method makes two bags per every cross-cutting. The former is called single-line bag making, and the latter is called two-line bag making. The two-line bag making has been attracting attention from the viewpoint of production efficiency.

The latter bag making apparatus disposes two side gussets between two upper and lower panel webs and temporarily seals the side gussets to the upper and lower panel webs. Furthermore, the bag making apparatus divides the upper panel web into two along its longitudinal direction and supplies an end face web to the lower panel web through a gap between the divided upper panel web to temporarily fix the end face web to the lower panel web. Furthermore, the bag making apparatus folds the upper panel web on the sides of its division edges to open the two side gussets by utilizing this folding and the temporary seal, thereby forming open surfaces.

In order to achieve this, disposing the side gussets requires locating one side gusset on one side with respect to the division line of the upper panel web and the other side gusset on the other side with respect to the division line to align these two side gussets in a single line in the width direction of the panel webs. This means that the operation of supplying a side gusset must be required twice. This is one of the factors which reduce the product efficiency.

An object of the present application is to provide a bag making apparatus and a bag making method capable of effectively making bags each having an end face part.

CITATION LIST

Patent Document

Patent document 1: WO2009/131214A1 Patent document 2: JP3655627 B1

SUMMARY

According to an aspect of the present application, there is provided a bag making apparatus comprising: a panel web feed device configured to superpose a first panel web and a second panel web on each other and to feed the first and second panel webs in a longitudinal direction of the first and second panel webs; a side gusset supply device configured to, before superposing of the first and second panel webs, dispose a side gusset on the second panel web in a width direction of the second panel web such that the side gusset is interposed between the first and second panel webs when the first and second panel webs are superposed on each other, the side gusset being folded in halves on opposite sides with respect to a longitudinal centerline thereof; a temporary fix device configured to temporarily fix the side gusset to the second panel web before the superposing of the first and second panel webs; a dividing device configured to, after temporary fixing of the side gusset and before the superposing of the first and second panel webs, divide the side gusset so as to form open edges such that the open edges are aligned with a first line of weakness of the first panel web when the first and second panel webs are superposed on each other, the open edges extending in a width direction of the side gusset, the first line of weakness extending in the longitudinal direction of the first panel web; a temporary seal device configured to seal the side gusset to the first and second panel webs to form temporary sealed sections after the superposing of the first and second panel webs; a first guide device configured to guide the first panel web as the first and second panel webs are fed, such that the first panel web is divided along the first line of weakness and folded on sides of division edges of the first panel web along fold lines, wherein the temporary sealed sections and guiding of the first panel web by the first guide device cause the side gusset to be opened at the open edges to form open surfaces, the fold lines extending in the longitudinal direction of the first panel web; and an end face web supply device configured to dispose an end face web on the first panel web in the longitudinal direction of the first and second panel webs so as to superpose the end face web on folded parts of the first panel web and the open surfaces as the first and second panel webs are fed, the bag making apparatus being configured to form panel parts of bags from the first and second panel webs, side gusset parts of the bags from the side gusset, and end face parts of the bags from the end face web.

A second line of weakness may be formed in the side gusset to extend in the width direction of the side gusset. The dividing device may be configured to divide the side gusset along the second line of weakness.

The dividing device may include: a suction cup for suctioning the side gusset; and a movement mechanism configured to suction the side gusset using the suction cup and move the suction cup in a direction away from the side gusset so as to tear the side gusset along the second line of weakness.

The temporary fix device may be configured to temporarily fix the side gusset to the second panel web on opposite sides with respect to the second line of weakness so as to form an unadhered area where a part of the side gusset including the second line of weakness is not adhered to the second panel web.

The dividing device may include: a blade; and a movement mechanism configured to move the blade to a position where the blade enters between the side gusset and the second panel web in the unadhered area as the second panel web is fed. The movement mechanism may be configured to move the blade in a direction away from the second panel web so as to tear the side gusset along the second line of weakness subsequent to the blade being inserted through a gap between the side gusset and the second panel web.

The dividing device may include a blade. The blade may be disposed at a position where a tip of the blade enters between the side gusset and the second panel web in the unadhered area as the second panel web is fed. The blade may have a sloping edge obliquely extending away from the second panel web towards a feed direction of the second panel web. The side gusset may ride up on the sloping edge as the side gusset is fed together with the second panel web, to be torn along the second line of weakness by the sloping edge.

The dividing device may include: a wire; and a support for supporting the wire such that the wire is inserted through a gap between the side gusset and the second panel web in the unadhered area when the side gusset is temporarily fixed to the second panel web. The wire may have a section located downstream of the temporary fix device and entering a feed path for the side gusset. The side gusset may be torn along the second line of weakness by the wire as the side gusset is fed together with the second panel web.

The dividing device may further include a hold down member disposed to hold down the side gusset on opposite sides with respect to the wire while the side gusset is torn along the second line of weakness by the wire.

The dividing device may include a slitter for slitting the side gusset as the first and second panel webs are fed.

The bag making apparatus may further include: an open surface seal device configured to, after the end face web is disposed, heat-seal the side gusset to the first and second panel webs and the end face web in the width direction of the first and second panel webs so as to form an auxiliary sealed section at least along a diagonal line of each of the open surfaces; a second guide device configured to, after forming of the auxiliary sealed section, further guide the first panel web as the first and second panel webs are fed, so as to fold the first panel web back along the fold lines, wherein folding back of the first panel web causes the end face web to be folded in halves; and a longitudinal seal device configured to, after the folding back of the first panel web, heat-seal the end face web to the first and second panel webs in the longitudinal direction of the first and second panel webs along the division edges so as to form a longitudinal sealed section.

The bag making apparatus may further include: a cross seal device configured to, after the end face web is disposed, heat-seal the side gusset to the first and second panel webs and the end face web in the width direction of the first and second panel webs so as to form a cross sealed section at least over an entire length of the side gusset; a slit device configured to, after forming of the cross sealed section, slit the first and second panel webs, the side gusset and the end face web in the longitudinal direction of the first and second panel webs along the division edges; and a cross cut device configured to, after slitting by the slit device, cross-cut the first and second panel webs, the side gusset and the end face web in the width direction of the first and second panel webs in a position of the cross sealed section such that the bags are made.

According to another aspect of the present application, there is provided a bag making method including: superposing a first panel web and a second panel web on each other and feeding the first and second panel webs in a longitudinal direction of the first and second panel webs; before superposing of the first and second panel webs, disposing a side gusset on the second panel web in a width direction of the second panel web such that the side gusset is interposed between the first and second panel webs when the first and second panel webs are superposed on each other, the side gusset being folded in halves on opposite sides with respect to a longitudinal centerline thereof; temporarily fixing the side gusset to the second panel web before the superposing of the first and second panel webs; after temporary fixing of the side gusset and before the superposing of the first and second panel webs, dividing the side gusset to form open edges such that the open edges are aligned with a first line of weakness of the first panel web when the first and second panel webs are superposed on each other, the open edges extending in a width direction of the side gusset, the first line of weakness extending in the longitudinal direction of the first panel web; after the superposing of the first and second panel webs, sealing the side gusset to the first and second panel webs to form temporary sealed sections; after forming of the temporary sealed sections, guiding the first panel web as the first and second panel webs are fed, to divide the first panel web along the first line of weakness and to fold the first panel web on sides of division edges of the first panel web along fold lines, the fold lines extending in the longitudinal direction of the first panel web; opening the side gusset at the open edges by utilizing guiding of the first panel web and the temporary sealed sections to form open surfaces; disposing an end face web on the first panel web in the longitudinal direction of the first and second panel webs to superpose the end face web on folded parts of the first panel web and the open surfaces of the side gusset as the first and second panel webs are fed; and forming panel parts of bags from the first and second panel webs, side gusset parts of the bags from the side gusset, and end face parts of the bags from the end face web.

A second line of weakness may be formed in the side gusset to extend in the width direction of the side gusset. The bag making method may include dividing the side gusset along the second line of weakness to form the open edges.

The bag making method may further include: after the end face web is disposed, heat-sealing the side gusset to the first and second panel webs and the end face web in the width direction of the first and second panel webs to form an auxiliary sealed section at least along a diagonal line of each of the open surfaces; after forming of the auxiliary sealed section, guiding the first panel web as the first and second panel webs are fed, to fold the first panel web back along the fold lines, wherein folding back of the first panel web causes the open surfaces to be closed and the end face web to be folded in halves; after the folding back of the first panel web, heat-sealing the end face web to the first and second panel webs in the longitudinal direction of the first and second panel webs along the division edges to form a longitudinal sealed section; after the end face web is disposed, heat-sealing the side gusset to the first and second panel webs and the end face web in the width direction of the first and second panel webs to form a cross sealed section at least over an entire length of the side gusset; after forming of the cross sealed section, slitting the first and second panel webs, the side gusset and the end face web in the longitudinal direction of the first and second panel webs along the division edges of the first panel web; and after slitting, cross-cutting the first and second panel webs, the side gusset and the end face web in the width direction of the first and second panel webs in a position of the cross sealed section to make the bags.

DETAILED DESCRIPTION

Hereinafter, a bag making apparatus and a bag making method according to implementations will be described with reference to the drawings.

Figure 1A:
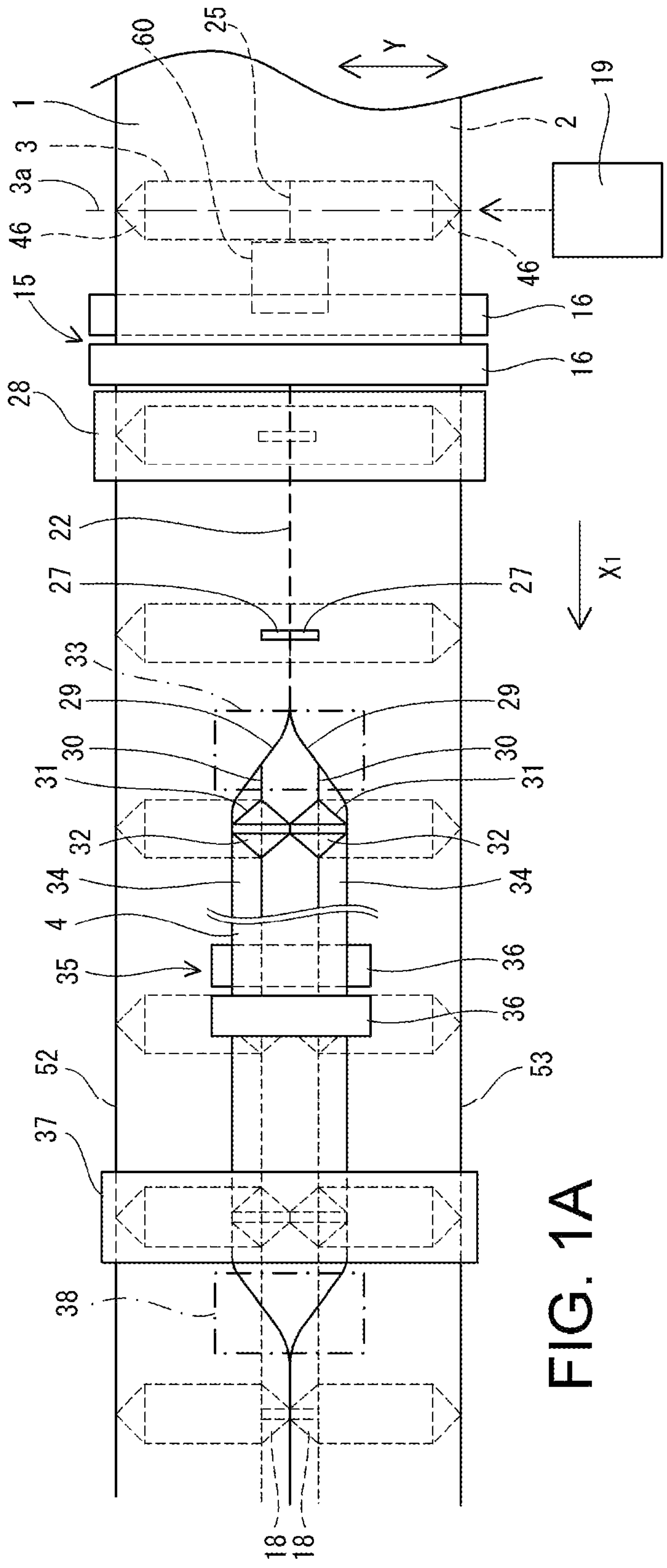
FIG. 1A is a schematic plan view of an upstream section of a bag making apparatus according to an implementation.
Figure 1B:
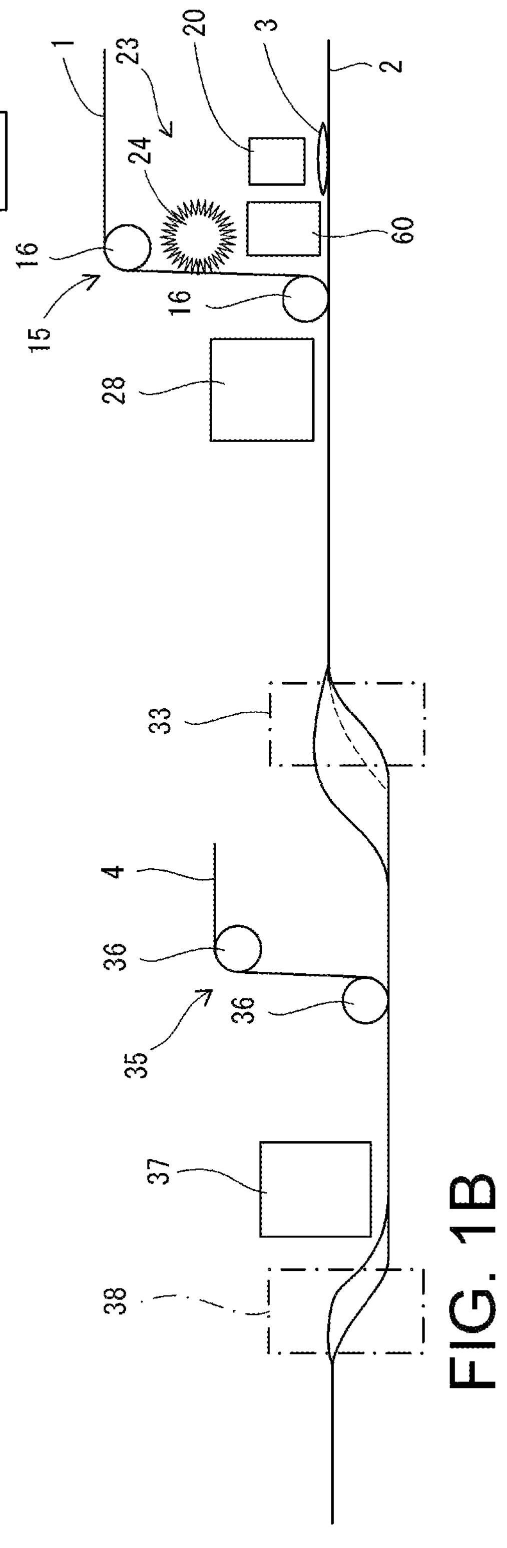
FIG. 1B is a schematic side view of FIG. 1A.
Figure 2:
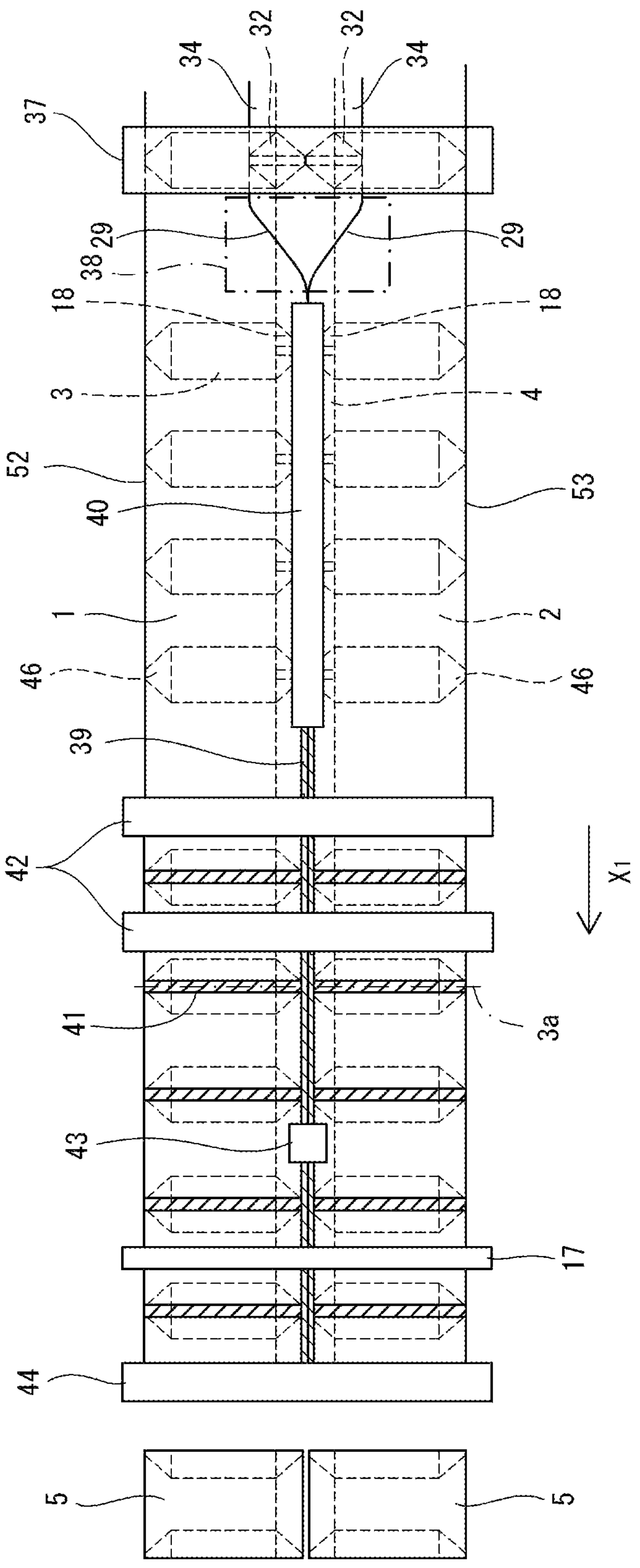
FIG. 2 is a schematic plan view of a downstream section of the bag making apparatus in FIG. 1A.
Figure 3:
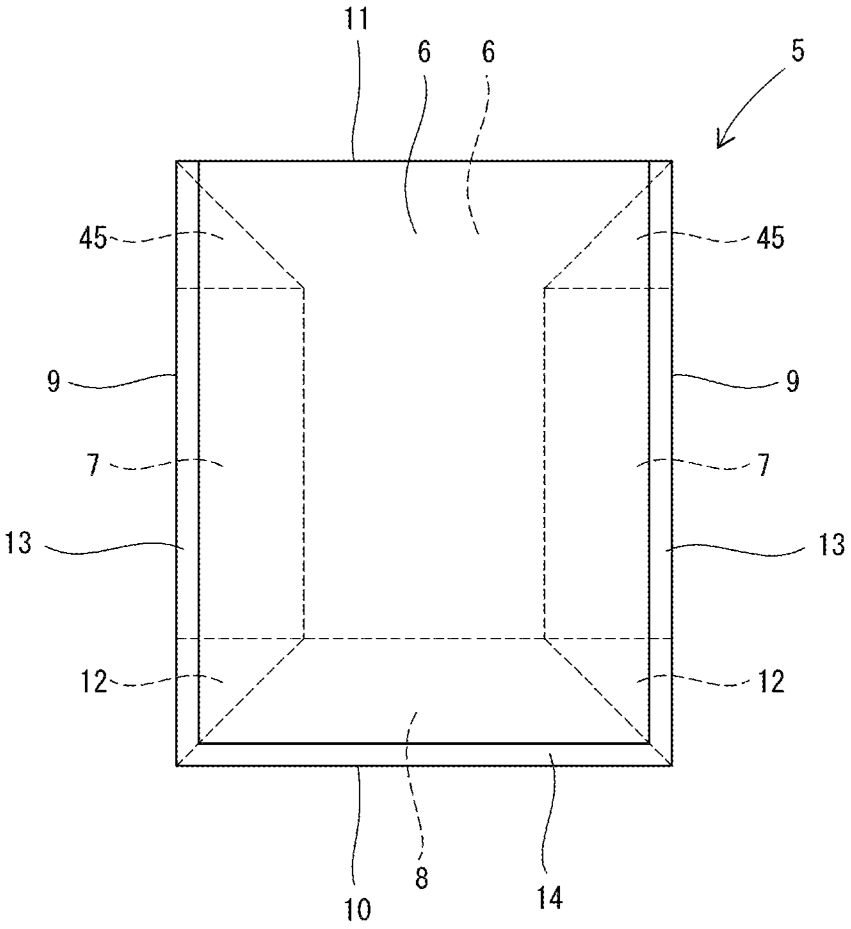
FIG. 3 illustrates a bag.

A bag making apparatus according to an implementation is illustrated in FIG. 1A, FIG. 1B and FIG. 2. The bag making apparatus makes bags of FIG. 3 from a first panel web 1, a second panel web 2, a side gusset 3 and an end face web 4. In each of the following implementations, the bag 5 is a square bottom bag and is also a plastic bag, and the first panel web 1, the second panel web 2, the side gusset 3 and the end face web 4 are plastic films. Instead of the plastic films, each of these components 1 to 4 may include, for example, a base made of paper and a film or resin material partially or fully laminated to the base.

The bag 5 includes two panel parts 6, two side gusset parts 7 and an end face part 8. The two panel parts 6 face each other to have opposite side edges 9 and opposite end edges 10 and 11. One end edge is a bottom edge 10, and the other end edge is a top edge 11.

The two side gusset parts 7 form a pair. The pair of side gusset parts 7 extends along the opposite side edges 9, is folded in half, and interposed between the two panel parts 6. One end portion of each side gusset part 7 is folded in half and interposed between the two layers of the side gusset part 7, so that an auxiliary gusset part 12 is formed. The other end portion of the side gusset part 7 is folded toward the outer surface of the side gusset part 7 as it remains folded in half, so that a triangular flap part 45 is formed.

The end face part 8 extends along the bottom edge 10, folded in half, and interposed between the two panel parts 6 and further between the respective auxiliary gusset parts 12. Therefore, the end face part 8 serves as the bottom gusset part.

The side gusset parts 7 are heat-sealed to the two panel parts 6 along the opposite side edges 9. Furthermore, the end face part 8 is heat-sealed to the auxiliary gusset parts 12 along the opposite side edges 9. Thereby, first sealed sections 13 are formed along the opposite side edges 9. The end face part 8 is heat-sealed to the two panel parts 6 along the bottom edge 10. Thereby, a second sealed section 14 is formed along the bottom edge 10. The top edge 11 is open.

The bag 5 can be expanded with the side gussets 7 to increase its capacity. When the bag 5 is expanded, the end face part 8 (bottom gusset part) forms a flat bottom base which allows the bag 5 to stand upright.

As illustrated in FIG. 1A and FIG. 1B, the bag making apparatus includes a panel web feed device 15. The panel web feed device 15 is configured to superpose the first panel web 1 and the second panel web 2 on each other and to feed them. The feed direction $X_1$ is the longitudinal direction of the panel webs 1 and 2. In the implementation, the panel web 1 is the upper panel web, and the panel web 2 is the lower panel web. The panel webs 1 and 2 are intermittently fed. This means that the panel webs 1 and 2 are repeatedly fed and paused.

The panel web feed device 15 incudes guide rollers 16 and a pair of feed rollers 17 (FIG. 2). The panel webs 1 and 2 are unwound from respective rolls thereof. Alternatively, a wide web (made of such as plastic film) may be unwound from a single roll and slit into the two panel webs 1 and 2. The panel web 1 is guided by the guide rollers 16 to cause the panel webs 1 and 2 to be superposed on each other. FIG. 2 only illustrates one roller of the pair of feed rollers 17. The pair of feed rollers 17 intermittently rotates when driven by a motor, and thereby intermittently feeds the panel webs 1 and 2 in the direction $X_1$.

The bag making apparatus further includes a side gusset supply device 19 (FIG. 1A). The side gusset supply device 19 is configured to, before the superposing of the first and second webs 1 and 2, supply the side gusset 3 to the panel web 2 and to dispose the side gusset 3 in the width direction of the panel webs 1 and 2 such that the side gusset 3 is interposed between the panel webs 1 and 2 when the panel webs 1 and 2 are superposed on each other.

Figure 4A:
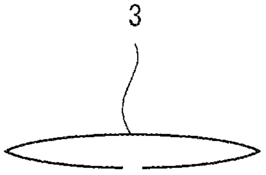
FIG. 4A is a cross sectional view of a side gusset.

The side gusset 3 is folded in halves on the opposite sides with respect to the longitudinal centerline 3$a$ thereof. As illustrated in FIG. 4A, the side gusset 3 therefore has a flat cylindrical shape. The side gusset 3 is somewhat wider than twice the width of the side gusset part 7 and somewhat longer than twice the length of the side gusset part 7. As illustrated in FIG. 1A, each of the corner portions of the side gusset 3 on the opposite sides is folded in halves with the angle of 45°, so that triangular flaps 46 are formed on the opposite sides of the side gusset 3.

The side gusset supply device 19 supplies the side gusset 3 to the panel web 2 and disposes the side gusset 3 on the upper surface of the panel web 2 in the width direction of the panel webs 1 and 2 during every intermittent feed cycle of the panel webs 1 and 2. Therefore, the side gusset 3 is interposed between the panel webs 1 and 2 when the panel webs 1 and 2 are superposed on each other by the panel web feed device 15. The side gusset supply device 19 may have a well-known configuration.

Figure 4B:
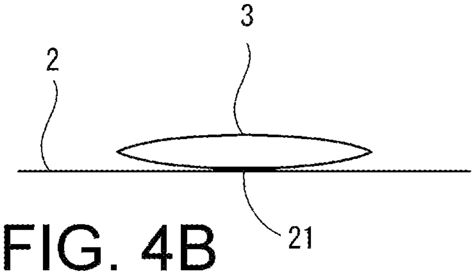
FIG. 4B illustrates temporary fixing of the side gusset.

The bag making apparatus further includes the temporary fix device 20 (FIG. 1B). The temporary fix device 20 is configured to temporarily fix the side gusset 3 to the panel web 2 so as to form a temporary fixed section 21 (adhered area) (FIG. 4B). The temporary fix device 20 is, for example, an ultrasonic device. The temporary fix device 20 adheres and thus temporarily fixes the side gusset 3 to the panel web 2 in the form of ultrasonic sealing or heat sealing to form a temporary fixed section 21 on the longitudinal centerline 3*a* of the side gusset 3 during every intermittent feed cycle of the panel webs 1 and 2. While the panel webs 1 and 2 are paused, the side gusset supply device 19 disposes the side gusset 3 on the panel web 2, and subsequently, the temporary fix device 20 temporarily fixes the side gusset 3 to the panel web 2.

The bag making apparatus further includes a line-of-weakness forming device 23 (FIG. 1B). The line-of-weakness forming device 23 is configured to form a first line of weakness 22 (FIG. 1A) in the panel web 1 before the superposing of the first and second panel webs 1 and 2. The first line of weakness 22 extends in the longitudinal direction of the panel web 1. The first line of weakness 22 in the implementation is perforations. The perforations 22 include holes which are successively aligned.

In the implementation, a line-of-weakness forming device 23 includes a perforation cutter 24 disposed upstream of the position where the panel webs 1 and 2 are superposed on each other. The perforation cutter 24 includes a plurality of cutting teeth over the entire circumference thereof, and at least one of the cutting teeth is engaged with the panel web 1. The perforation cutter 24 rotates as the panel web 1 is fed such that the perforations 22 are formed in the panel web 1 by the perforation cutter 24.

Figure 4C:
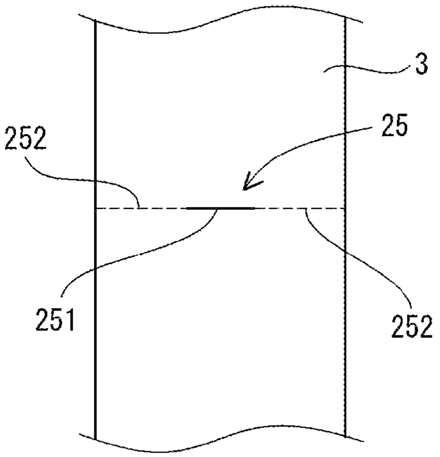
FIG. 4C illustrates perforations in the side gusset.

The bag making apparatus in this implementation further includes an additional line-of-weakness forming device. The additional line-of-weakness forming device is configured to form a second line of weakness 25 (FIG. 1A) (which extends in the width direction of the side gusset 3) in the side gusset 3 before the side gusset 3 is disposed on the panel web 2. The line of weakness 25 in the implementation is perforations too. As illustrated in FIG. 4C, the perforations 25 include a first slit 251 and a plurality of second slits 252. The first slit 251 is located in the widthwise middle section of the side gusset 3. The second slits 252 are located on the opposite sides with respect to the first slit 251. The length of the first slit 251 in the width direction of the side gusset 3 is longer than the length of each second slit 252 in the width direction of the side gusset 3. This facilitates cutting the side gusset 3 open as described below.

Figure 5A:
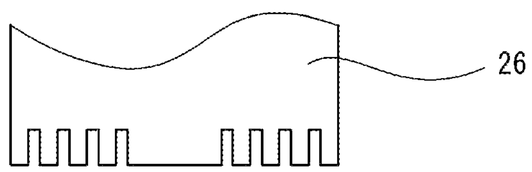
FIG. 5A and FIG. 5B illustrate perforation cutters for side gussets.

The additional line-of-weakness forming device includes, for example, an additional perforation cutter 26 illustrated in FIG. 5A. The perforation cutter 26 has cutting teeth which correspond to the shape of the perforations 25. This device perforates the side gusset 3 using the perforation cutter 26 to form the perforations 25 in the side gusset 3. The side gusset supply device 19 supplies the side gusset 3 with the perforations 25 to the panel web 2 and disposes the side gusset 3 on the panel web 2.

Figure 4D:
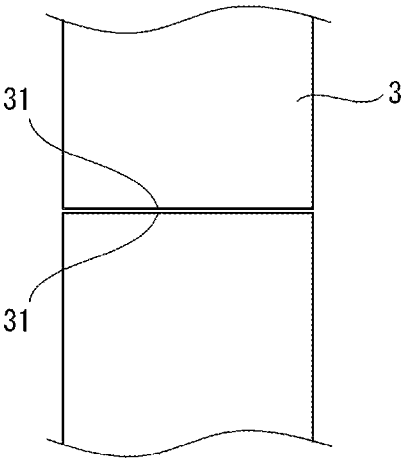
FIG. 4D illustrates division of the side gusset.

The bag making apparatus further includes a dividing device 60. The dividing device 60 is configured to, after the temporary fixing of the side gusset 3 and before the superposing of the panel sheets 1 and 2, divide the side gusset 3 so as to form a pair of open edges (FIG. 4D) 31 such that the pair of open edges 31 is aligned with the first line of weakness (perforations) 22 when the panel webs 1 and 2 are superposed on each other by the panel web feed device 15. The dividing device 60 divides a side gusset 3 during every intermittent feed cycle. In the implementation, the side gusset 3 is divided into two.

Figure 6A:
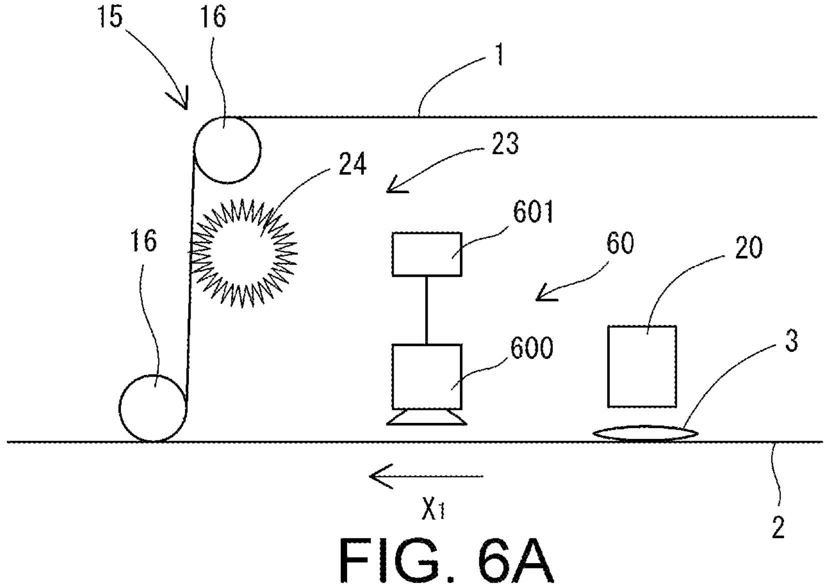
FIG. 6A illustrates an example of a dividing device.
Figure 6B:
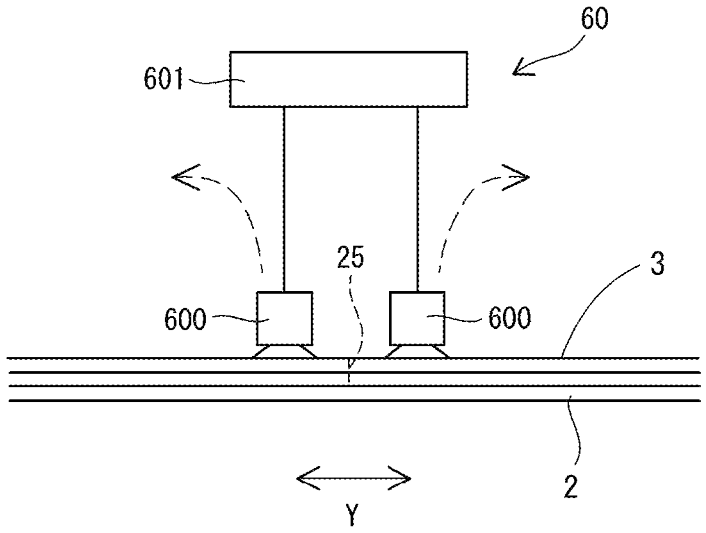
FIG. 6B is a side view of it.

FIG. 6A and FIG. 6B illustrates an example of the dividing device 60. The reference sign Y in FIG. 6B designates the width direction of the panel web 2 (and thus the longitudinal direction of the side gusset 3). The dividing device 60 in this implementation includes two suction cups 600 located downstream of the temporary fix device 20 and upstream of the position where the panel webs 1 and 2 are superposed on each other, to suction the side gusset 3, and a movement mechanism 601 configured to move each of the suction cups 600. For example, the movement mechanism 601 may include arms provided for the respective suction cups 600 to move the corresponding suction cup 600.

The movement mechanism 601 suctions one layer (upper layer) of the side gusset 3 on the opposite sides with respect to the perorations (the second line of weakness) 25 using the suction cups 600 (FIG. 6B) while the panel webs 1 and 2 are paused. Then, while the panel webs 1 and 2 are paused, the movement mechanism 601 moves the suction cups 600 in the direction away from the side gusset 3, as indicated by the dotted arrows in FIG. 6B. Since the other layer (lower layer) of the side gusset 3 is temporarily fixed to the panel web 2 at the longitudinal centerline 3*a*, the upper layer of the side gusset 3 is pulled up on the opposite sides with respect to the perforations 25 by the suction cups 600 to be torn along the perforations 25. Therefore, the side gusset 3 is divided along the perforations 25, so that a pair of open edges 31 is formed. This is repeated every intermittent feed cycle.

The dividing device 60 may divide the side gusset 3 using the suction cup 600 and a hold down member (not shown). The dividing device 60 holds down the side gusset 3 on one side with respect to the perforations 25 using the hold down member and suctions the side gusset 3 on the other side with respect to the perforations 25 using the suction cup 600. The dividing device 60 then may move the suction cup 600 to tear the side gusset 3 along the perforations 25.

As illustrated in FIG. 1A and FIG. 1B, the bag making apparatus further includes a temporary seal device 28. The temporary seal device 28 is configured to, after the superposing of the panel webs 1 and 2, seal the side gusset 3 to the panel webs 1 and 2 so as to form temporary sealed sections 27 (FIG. 1A). The temporary sealed sections 27 are used for forming open surfaces, which will be described below. The temporary seal device 28 seals one of the two layers of the side gusset 3 and the panel web 1 to each other, and simultaneously seals the other layer of the side gusset 3 and the panel web 2 to each other during every intermittent feed cycle of the panel webs 1 and 2. Thereby, the pair of temporary sealed sections 27 is formed, one of which is located on one side with respect to the open edges 31 (and thus the perforations 22 aligned with these) and the other of which is located on the other side with respect to the open edges 31. The temporary seal device 28 may seal the side gusset 3 to the panel webs 1 and 2, for example in the form of heat seal or ultrasonic.

Figure 4E:
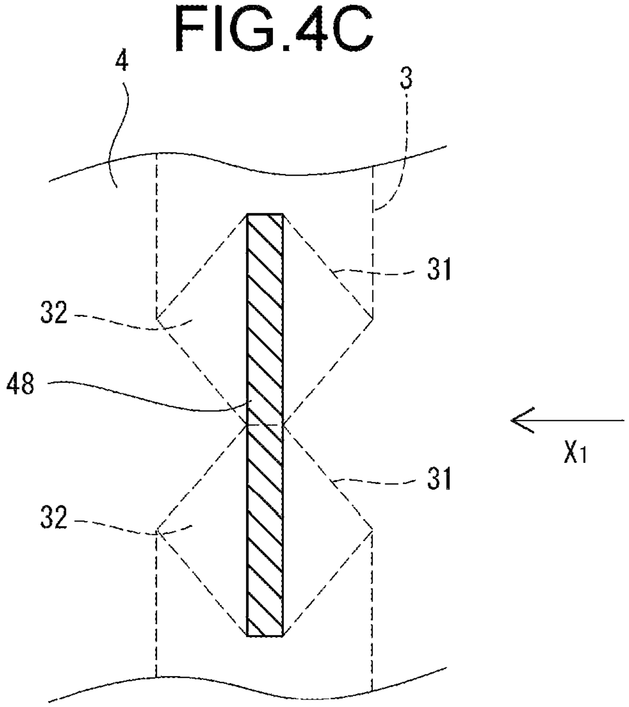
FIG. 4E illustrates forming of an auxiliary sealed section.

The bag making apparatus further includes a first guide device 33. The first guide device 33 is configured to, after the forming of the temporary sealed sections 27, guide the panel web 1 as the panel webs 1 and 2 are fed, so as to divide the panel web 1 along its perforations 22 into two and so as to fold the panel web 1 on the sides of its two division edges 29 along the fold lines 30. The first guide device 33 is further configured to open the side gusset 3 at the pair of open edges 31 by utilizing this guiding of the panel web 1 and the temporary sealed sections 27 so as to form two open surfaces 32 (FIG. 1A and FIG. 4E).

The first guide device 33 includes guide members such as guide rollers, plates, pinch rollers and so on, as in Patent document 1. As the panel webs 1 and 2 are fed, the panel web 1 is divided along the perforations 22 into two by the guide members. The division of the panel web 1 results in a pair of division edges 29. Furthermore, as the panel webs 1 and 2 are fed, the panel web 1 is folded by the first guide device 33 along a pair of fold lines 30 on the sides of the division edges 29. Thereby, a pair of folded parts 34 is formed from the panel web 1. The fold lines 30 extend in the longitudinal direction of the panel webs 1 and 2.

The temporary sealed sections 27 adhere the upper layer of the side gusset 3 to the panel web 1 and the lower layer of the side gusset 3 to the panel web 2. Therefore, when the panel web 1 is folded (lifted), the upper layer of the side gusset 3 is pulled up by the temporary sealed sections 27. This pulling up causes the side gusset 3 to be opened at the open edges 31 so as to form a pair of open surfaces 32. Each of the open surfaces 32 has a substantially rhombus shape.

The bag making apparatus further includes an end face web supply device 35. The end face web supply device 35 is configured to supply the end face web 4 to the panel web 1 as the panel webs land 2 are fed and to dispose the end face web 4 on the panel web 1 (its folded parts 34) in the longitudinal direction of the panel webs 1 and 2 so as to superpose the end face web 4 on the pair of folded parts 34 and the pair of open surfaces 32. The end face web 4 is somewhat wider than twice the width of the end face part 8 of the bag 5.

The end face web supply device 35 includes guide rollers 36. The end face web 4 is unwound from a roll. As the panel webs 1 and 2 are fed, the end face web 4 is guided by the guide rollers 36, supplied to the panel web 1, and disposed in the width direction of the panel webs 1 and 2 such that the end face web 4 is superposed on the pair of folded parts 34 and the pair of open surfaces 32. As in JP6381169B1, a wide web (e.g., made of plastic film) may be unwound from a roll thereof and divided in its longitudinal direction into the end face web 4 and the panel web 1 or 2.

The bag making apparatus further includes an open surface seal device 37. The open surface seal device 37 is configured to, after the supply of the end face web 4, seal the side gusset 3 to the panel webs 1 and 2 and the end face web 4 in the width direction of the panel webs 1 and 2 so as to form an auxiliary sealed section 48 (illustrated only in FIG. 4E).

The open surface seal device 37 includes, for example, heat seal bars. The open surface seal device 37 heat-seals the side gusset 3 to the panel webs 1 and 2 and the end face web 4 in the width direction of the panel webs 1 and 2 along the diagonal lines of the pair of respective open surfaces 32 using the heat seal bars during every intermittent feed cycle of the panel webs 1 and 2. Thereby, the auxiliary sealed section 48 is formed at least along the diagonal line of each open surface 32. The end face web 4 is adhered to the pair of open surfaces 32 due to the auxiliary sealed section 48.

The bag making apparatus further includes a second guide device 38. The second guide device 38 is configured to, after the forming of the auxiliary sealed section 48, guide the panel web 1 as the panel webs 1 and 2 are fed, so as to fold the panel web 1 back along the fold lines 30 such that the folding back of the panel web 1 causes the open surfaces 32 to be closed, thereby forming the auxiliary gussets 18 and folding the end face web 4 in halves.

The second guide device 38 includes guide members such as guide rollers, plates, pinch rollers and so on. As the panel webs 1 and 2 are fed, the panel web 1 is guided by the guide members to be folded back along the pair of fold lines 30. This folding back of the panel web 1 causes the pair of open surfaces 32 to be closed, so that two auxiliary gussets 18 are formed from the open surfaces 32. Furthermore, the folding back of the panel web 1 also causes the end face web 4 to be folded in halves on the opposite sides with respect to the longitudinal centerline thereof (which is parallel to the longitudinal direction of the panel webs 1 and 2). As a result, the end face web 4 which has been folded in halves is interposed between the panel webs 1 and 2 and also between the respective auxiliary gussets 18 formed from the opening surfaces 32. In addition, the pair of division edges 29 is aligned with each other.

As illustrated in FIG. 2, the bag making apparatus further includes a longitudinal seal device 40. The longitudinal seal device 40 is configured to, after the folding back of the panel web 1, heat-seal the end face web 4 to the panel webs 1 and 2 along the division edges 29 in the longitudinal direction of the panel webs 1 and 2 so as to form a longitudinal sealed section 39 along the division edges 29. The longitudinal seal device 40 includes a pair of heat seal bars, and performs heat-sealing using the heat seal bars to form the longitudinal sealed section 39 during every intermittent feed cycle of the panel webs 1 and 2.

The bag making apparatus further includes a cross seal device 42. The cross seal device 42 is configured to heat-seal the side gusset 3 to the panel webs 1 and 2 and the end face web 4 in the width direction of the panel webs 1 and 2 so as to form a cross sealed section 41 at least over the entire length of the side gusset 3 (preferably over the entire width of the panel webs 1 and 2) after the end face web 4 is disposed on the panel web 1.

The cross seal device 42 includes two pairs of heat seal bars, and performs heat-sealing using the heat seal bars to form the cross sealed section 41 during every intermittent feed cycle of the panel webs 1 and 2. The aforementioned auxiliary sealed section 48 is included in the cross sealed section 41 and thus integrated with the cross sealed section 41. In the implementation, the cross heat-sealing is performed after the folding back of the panel web 1. The position of this heat-sealing is the position of the longitudinal centerline 3*a* of the side gusset 3. Therefore, the cross sealed section 41 extends along the centerline 3*a*. Since the end face web 4 is interposed between the respective auxiliary gussets 18 of the side gusset 3, the end face web 4 is sealed to the side gusset 3 in the position of the auxiliary gussets 18.

The bag making apparatus further includes a slit device 43. The slit device 43 is configured to slit the panel webs 1 and 2, the side gusset 3 and the end face web 4 in the longitudinal direction of the panel webs 1 and 2 as the panel webs 1 and 2 are fed. The position of this slitting is the position of the pair of division edges 29 which has been aligned with each other, and thus in the implementation, is the position of the longitudinal sealed section 39. As a result, the panel web 2 and the end face web 4 are also divided, respectively.

As in Patent document 1, the slit device 43 includes a pair of slitters disposed and spaced apart from one another in the width direction of the panel webs 1 and 2. As the panel webs 1 and 2 are fed, the panel webs 1 and 2, the side gusset 3 and the end face web 4 are slit along the division edges 29 by the slitters. Although a margin is generated between the slitters, it is wound up by a well-known winder as in Patent document 1 and separated as a waste from the panel webs 1 and 2.

The bag making apparatus further includes a cross cut device 44. The cross cut device 44 is configured to, after the slitting, cross-cut the panel webs 1 and 2, the side gusset 3 and the end face web 4 in the width direction of the panel webs 1 and 2, thereby making the bags 5. The position of the cross-cutting is the position of the cross sealed section 41.

The cross cut device 44 of the bag making apparatus further includes a cutter. The cross cut device 44 cross-cuts the panel webs 1 and 2, the side gusset 3 and the end face web 4 in the width direction of the panel webs 1 and 2 in the position of the cross sealed section 41 using the cutter during every intermittent feed cycle of the panel webs 1 and 2. Thereby, two bags 5 are made every cross-cutting in the implementation.

Thus, the panel parts 6 of the bag 5 are formed from the panel webs 1 and 2, each side gusset part 7 is formed from the side gusset 3, and the end face part 8 is formed from the end face web 4. Specifically, each auxiliary gusset part 12 is formed from the auxiliary gusset 18. The second sealed section 14 is formed from the longitudinal sealed section 39. Each first sealed section 13 is formed from the cross sealed section 41. Each triangular flap part 45 is formed from the triangular flap 46.

The facing surfaces of the panel webs 1 and 2 facing each other are made of sealant such as polyethylene or polypropylene, whereas their opposite surfaces are made of base material such as nylon or PET. The outer surface of the side gusset 3 which has been folded in halves is made of the sealant, whereas its inner surface is made of the base material. The facing surface of the end face web 4 facing the panel webs 1 and 2 is made of the sealant, whereas its opposite surface is made of the base material. Heat-sealing the films to each other is achieved due to the sealant. These are the same as those disclosed in Patent documents 1 and 2.

The bag making apparatus may further include a filling device for filling the bag 5 with contents through the top edge 11 and an additional seal device for heat-sealing the two panel parts 6 to each other along the top edge 11 after the step for filling.

Figure 7A:
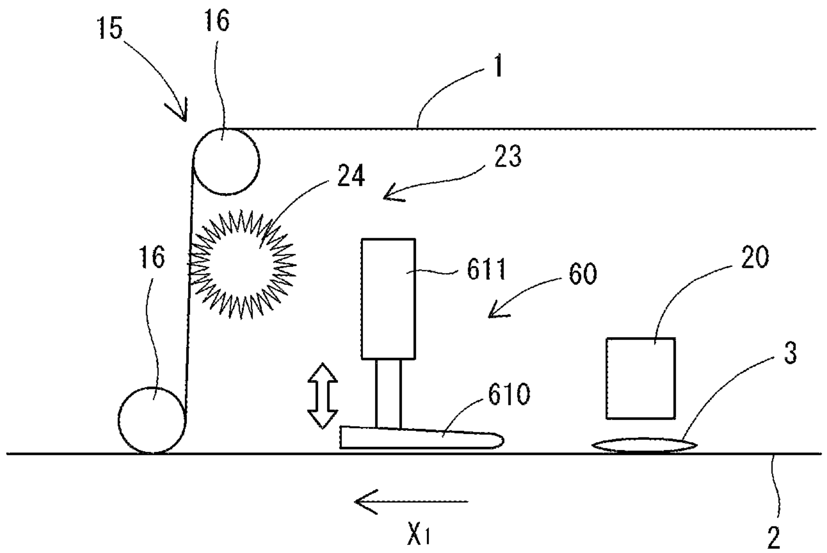
FIG. 7A illustrates an example of the dividing device.

FIG. 7A illustrates another example of the dividing device 60. The dividing device 60 includes a blade 610 located downstream of the temporary fix device 20 and upstream of the position where the panel webs 1 and 2 are superposed on each other, and the movement device 611 for moving the blade 610 towards and away from the panel web 2. The blade 610 has an R-Shaped tip (upstream tip) in order not to damage the side gusset 3. The blade 610 is in line in the feed direction $X_1$ with the perforations 25 of the side gusset 3 temporarily fixed to the panel web 2 by the temporary fix device 20. The movement mechanism 611 may include an actuator, e.g., an air cylinder, for moving the blade 610 vertically.

Figure 7B:
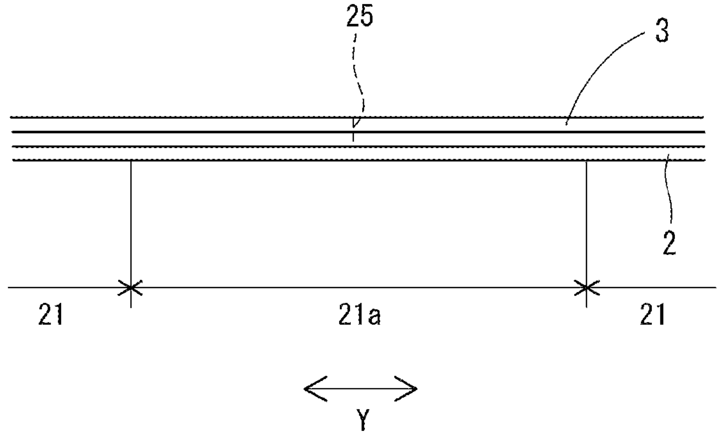
FIG. 7B illustrates temporary fixing.

As illustrated in FIG. 7B, the temporary fix device 20 temporarily fixes the side gusset 3 to the panel web 2 on the opposite sides with respect to the perforations 25 to form an unadhered area 21*a* where the part of the side gusset 3 including the perforations 25 is not adhered to the panel web 2. In other words, the temporary fix device 20 forms two temporary sealed sections 21 (adhered areas) which are spaced from one another in the direction Y and located on the opposite sides with respect to the perforations 25, so that the unadhered area 21*a* is formed between the temporary sealed sections 21 (adhered areas).

Figure 8A:
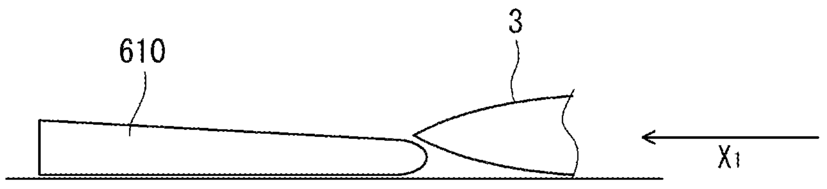
FIG. 8A to FIG. 8C illustrate division of the side gusset.
Figure 8B:
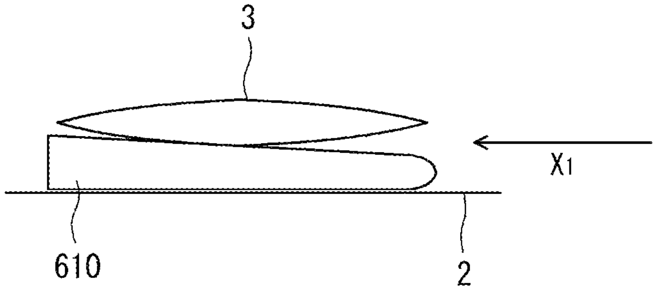

As illustrated in FIG. 8A, the blade 610 is positioned close to the panel web 2 by the movement mechanism 611. When the blade 610 is at this position, the blade 610 enters from its tip between the side gusset 3 and the panel web 2 in the unadhered area 21*a* and is then inserted through the gap between these, as the panel webs 1 and 2 are fed (see FIG. 8A to FIG. 8C).

Figure 9A:
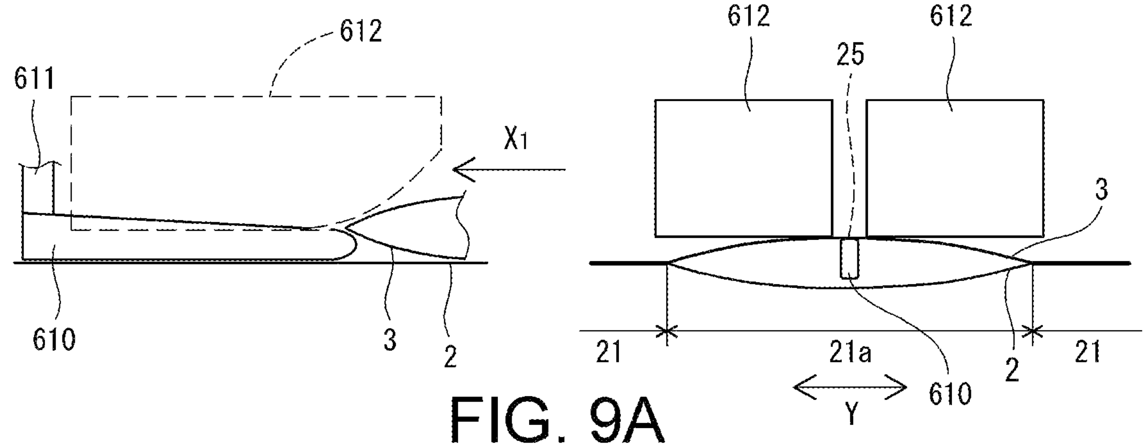
FIG. 9A to FIG. 9C illustrate division of the side gusset.
Figure 9B:
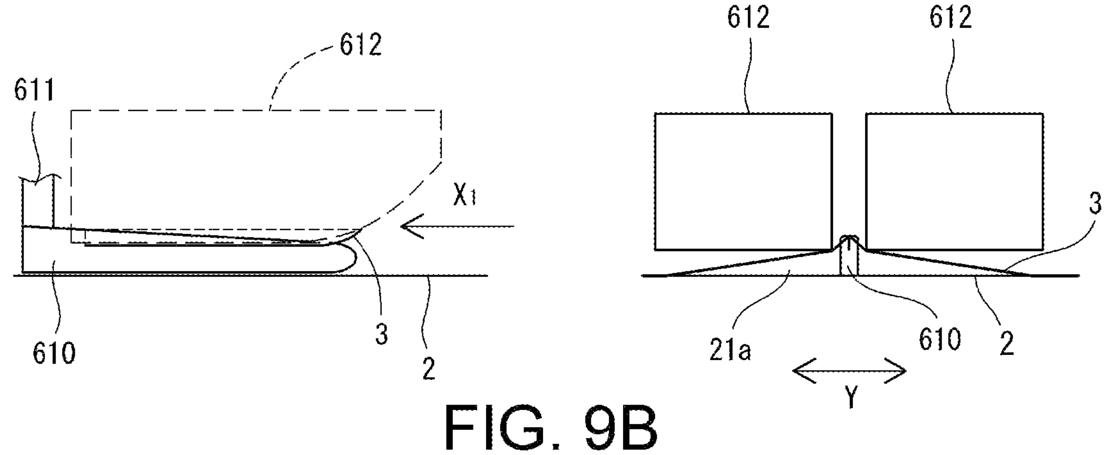
Figure 9C:
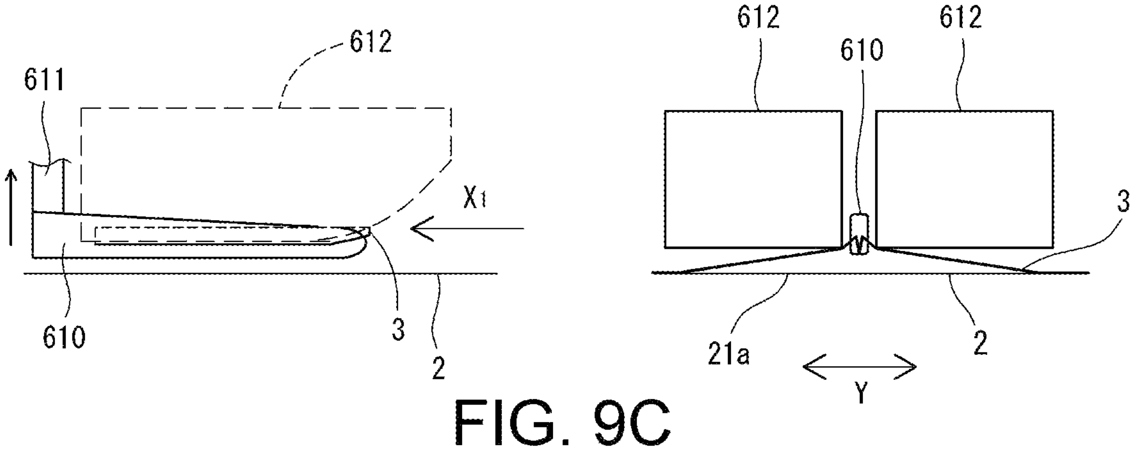

Thereafter, the movement mechanism 611 moves the blade 610 in the direction away from the panel web 2 (that is, upward) as illustrated in FIG. 9A to FIG. 9C, to tear the side gusset 3 along the perforations 25 (see FIGS. 9A to C), while the panel webs 1 and 2 are paused. Therefore, the side gusset 3 is divided along the perforations 25, so that the pair of open edges 31 (FIG. 4D) is formed. The movement mechanism 611 then returns the blade 610 to the position illustrated in FIG. 8A. Dividing a side gusset 3 is repeated every intermittent feed cycled of the panel webs 1 and 2.

As illustrated in FIG. 9 to FIG. 9C, the stoppers 612 may be disposed on the opposite sides with respect to the blade 610 and spaced from one another in the direction Y to hold down the side gusset 3 while the side gusset 3 is torn by the blade 610. This restrains the side gusset 3 from being peeled off the panel web 2 in the adhered areas 21 while the side gusset 3 is torn by the blade 610.

Figure 10A:
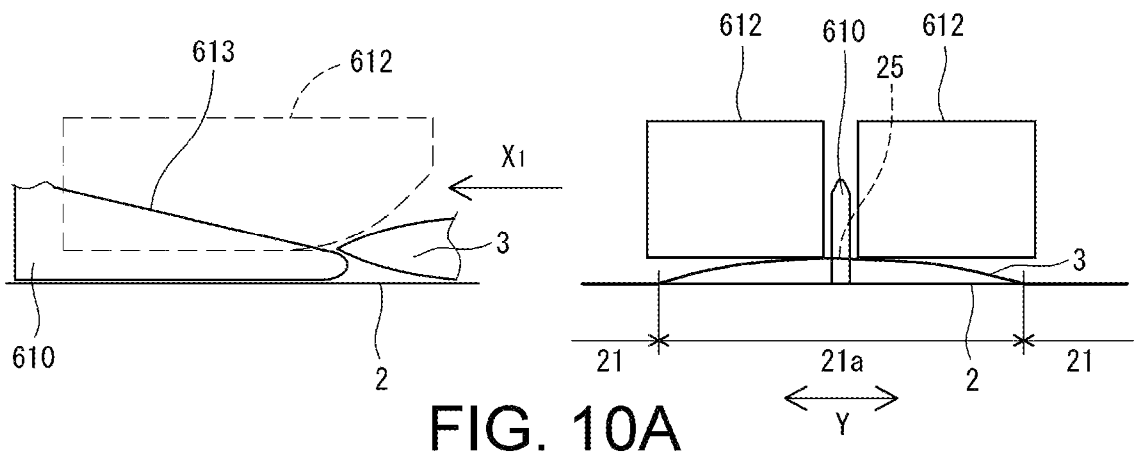
FIG. 10A to FIG. 10C illustrate an example of the dividing device and illustrate division of the side gusset.
Figure 10B:
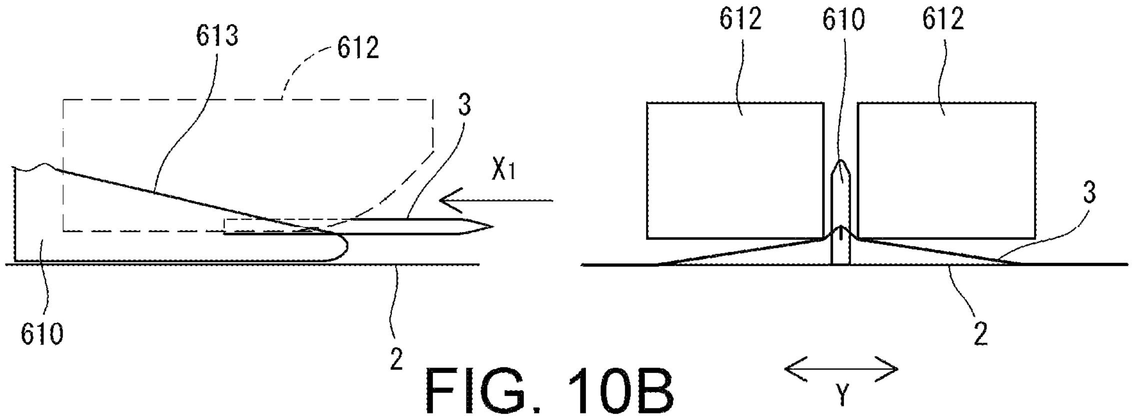
Figure 10C:
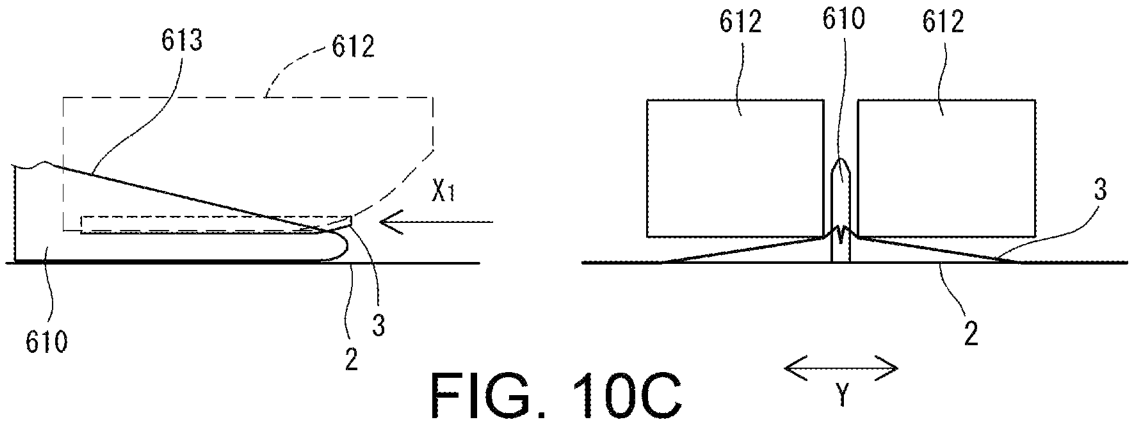

FIG. 10A to FIG. 10C illustrate another example of the use of the blade 610. The dividing device 60 does not include the afore-mentioned movement mechanism 611 (FIG. 7A). The blade 610 is supported by the frame (not shown) to be located at the position where the tip of the blade 610 will enter between the side gusset 3 and the panel web 2 in the unadhered area 21*a* as the panel webs 1 and 2 are fed. The blade 610 has the R-shaped tip. The blade 610 is shaped to gradually increase in height towards the feed direction $X_1$. Therefore, the blade has a sloping edge 613 (upper edge) obliquely extending away from the panel web 2 towards the feed direction $X_1$ of the panel webs 1 and 2.

As the side gusset 3 is fed together with the panel web 2, the tip of the blade 610 is entering between the panel web 2 and the side gusset 3 in the unadhered area 21*a*. During this, the side gusset 3 is riding up on the sloping edge 613 to be gradually torn along the perforations 25 by the sloping edge 613. Therefore, the side gusset 3 is divided along the perforations 25, so that the pair of open edges 31 is formed. Dividing a side gusset 3 is repeated every intermittent feed cycle of the webs 1 and 2.

Figure 5B:
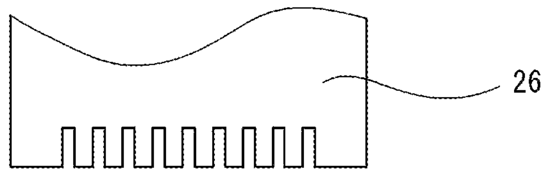

Also in this example, the stoppers 612 may be disposed to refrain the side gusset 3 and the panel web 2 from being peeled off in the adhered areas 21 in dividing the side gusset 3.

Where the blade 610 is used, once the side gusset 3 is torn at its downstream side edge, it will then be torn smoothly. Therefore, the perforations 25 may be formed by the perforation cutter 26 having wide cutting teeth at the opposite end portions thereof, as illustrated in FIG. 5B.

Figure 11A:
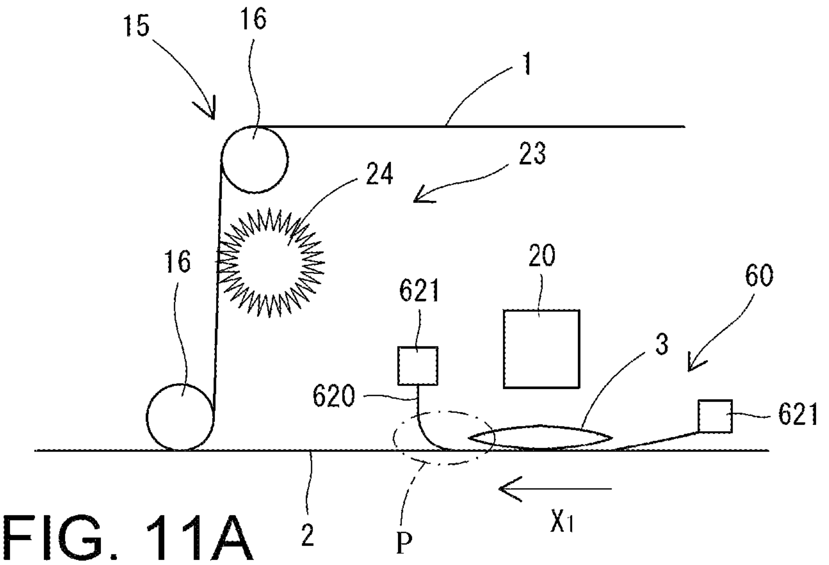
FIG. 11A to FIG. 11C illustrate an example of the dividing device.
Figure 11B:
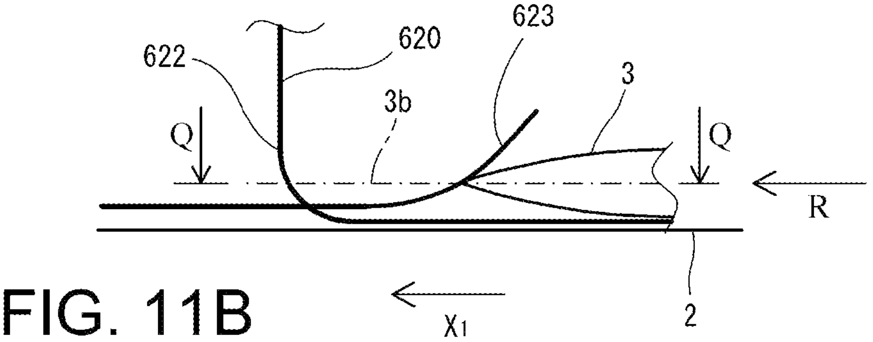
Figure 11C:
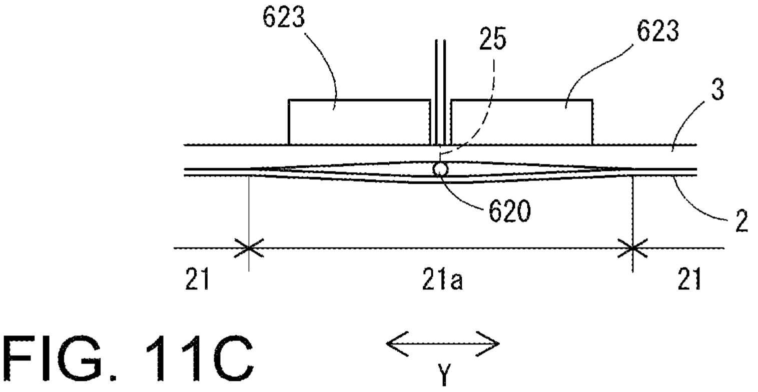

FIG. 11A to FIG. 11C illustrate yet another example of the dividing device 60. FIG. 11B is an enlarged view of the region P in FIG. 11A. FIG. 11C is an arrow view of the arrow R in FIG. 11B.

The dividing device 60 includes a wire 620 and two support 621 which support the wire 620 in such a manner that the wire 620 extends across the temporary fix device 20 in the feed direction $X_1$, so as to cause the wire 620 to be aligned with the perforations 25 between the side gusset 3 and the panel web 2 when the side gusset supply device 19 (FIG. 1A) disposes the side gusset 3 on the panel web 2. Therefore, the wire 620 is supported by the supports 621 such that the wire 620 is inserted through a gap between the side gusset 3 and the panel web 2 in the unwelded area 21*a* when the temporary fix device 20 has temporarily fixed the side gusset 3 to the side gusset 2.

The wire 620 is rigid to some degree. For example, its diameter may be about 1.5 mm. The wire 620 has a section 622 located downstream of the temporary fix device 20 and entering the feed path 3*b* for the side gusset 3, as illustrated in FIG. 11B. This entering section 622 is constituted by a section of the wire 620 bent from horizontal to upward.

The dividing device 60 may further include at least one hold down member 623 disposed downstream of the temporary fix device 20, as illustrated in FIG. 11B and FIG. 11C. In the implementation, two plate shaped hold down members 623 are disposed on the opposite sides with respect to the wire 620 and spaced from one another in the direction Y.

As the side gusset 3 is fed together with the panel web 2, it is held down towards the panel web 2 by the hold down members 623 and touches the wire 620 (the entering section 622). As the side gusset 3 is then further fed, it is torn along the perforations 25 by the wire 620. As a result, the side gusset 3 is divided along the perforations 25, so that the pair of open edges 31 is formed. Dividing a side gusset 3 is repeated every intermittent feed cycle of the panel webs 1 and 2.

Although the wire 620 illustrated in FIG. 11A to FIG. 11C has a circular cross section, it may have a wedge cross section narrowing upstream instead. This makes it easier to tear the side gusset 3. The wire 620 may have a polygonal cross section, such as a rectangular cross section, and be disposed with one of its corners oriented upstream. This also makes it easier to tear the side gusset 3.

Figure 12A:
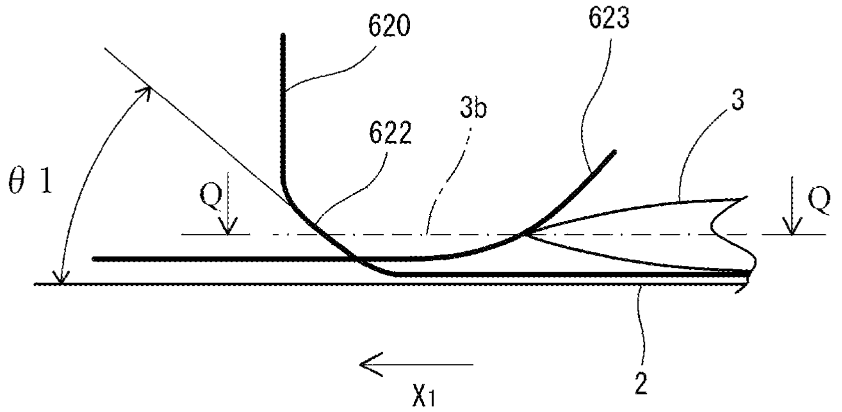
FIG. 12A illustrates a variation of FIG. 11B, and FIG. 12B to FIG. 12D are cross sections taken along a line Q-Q in FIG. 11B or FIG. 12A, each illustrating a hold down member.
Figures 12B, 12C, 12D:
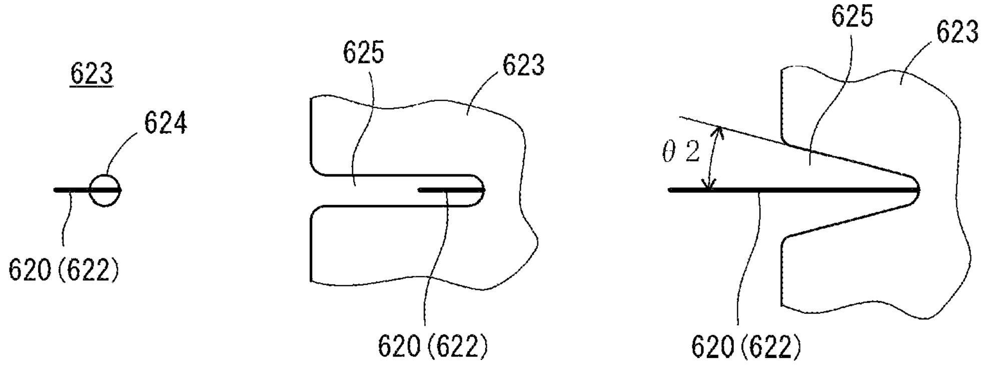

As illustrated in FIG. 12A, the entering section 622 of the wire 620 may be constituted by an inclined section with the inclination angle θ1 with respect to the panel web 2. FIGS. 12B to 12D are cross sectional views taken along the line Q-Q in FIG. 11B or 12A, illustrating other examples of the hold down member 623. Only one hold down member 623 may be provided and have, for example, a hole 624 (FIG. 12B) or a notch 625 (FIG. 12C or D) which allows passage of the wire 620 (the entering section 622). The notch 625 in FIG. 12D is shaped to widen downstream with the inclination angle θ2. The entering section 622 of the wire 620 may have a curved shape that is convex downward.

Where the wire 620 in FIG. 12A and the hold down member 623 in FIG. 12D are used, adjusting the inclination angles θ1 and 02 enables adjusting the stress for tearing the side gusset 3. In other words, if the distribution of the tensile force (F) in the direction $X_1$ is uniform when the side gusset 3 is pulled in the direction Y to be torn using the wire 620 and the hold down member 623 in FIG. 12D, the maximum tensile force is less likely to be applied to the downstream edge of the side gusset 3 and it is less likely to be torn. If 01 is smaller and 02 is larger, this tendency is stronger. Conversely, if 01 is larger and 02 is smaller, the maximum tensile force is more likely to be applied to the downstream edge of the side gusset 3. However, if 01 is too large, such as close to 90 degrees, deformation such as wrinkling is likely to occur before the downstream edge is torn. Thus, selecting a combination of 01 and 02 enables the distribution of the tensile force (F) in the direction $X_1$ to be an appropriate one in which the tensile force (F) is maximum at the downstream edge. 01 is preferably in the range of 10 to 40 degrees, and 02 is preferably in the range of 0 to 30 degrees.

Figure 13A:
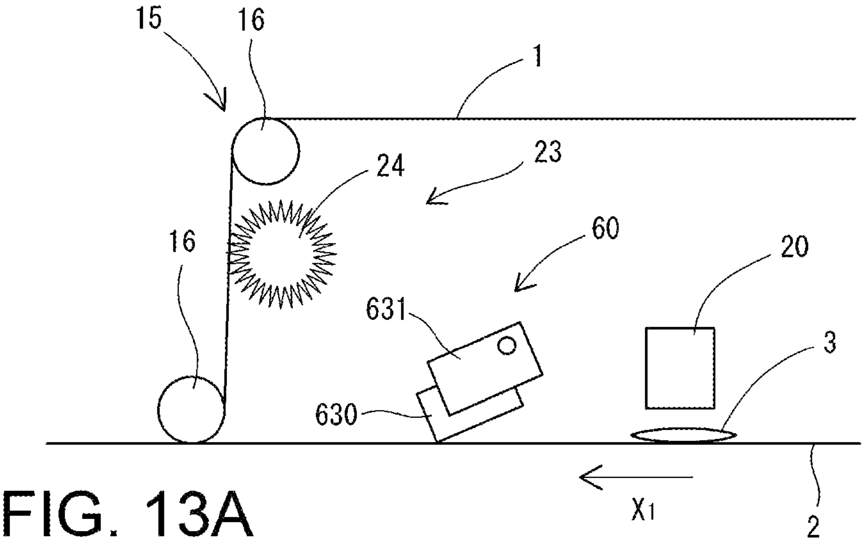
FIG. 13A illustrates an example of the dividing device.
Figure 13B:
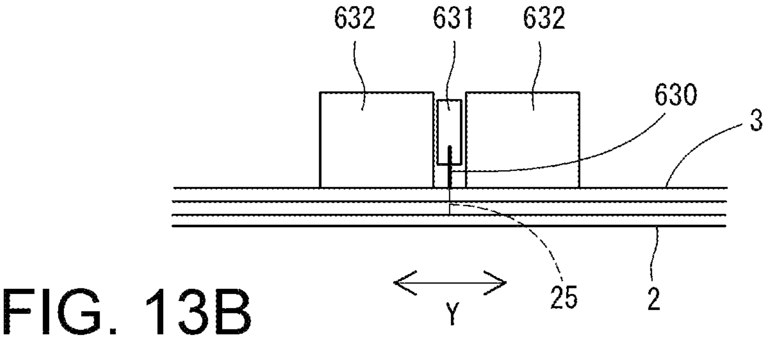
FIG. 13B is a side view of FIG. 13A.
Figure 13C:
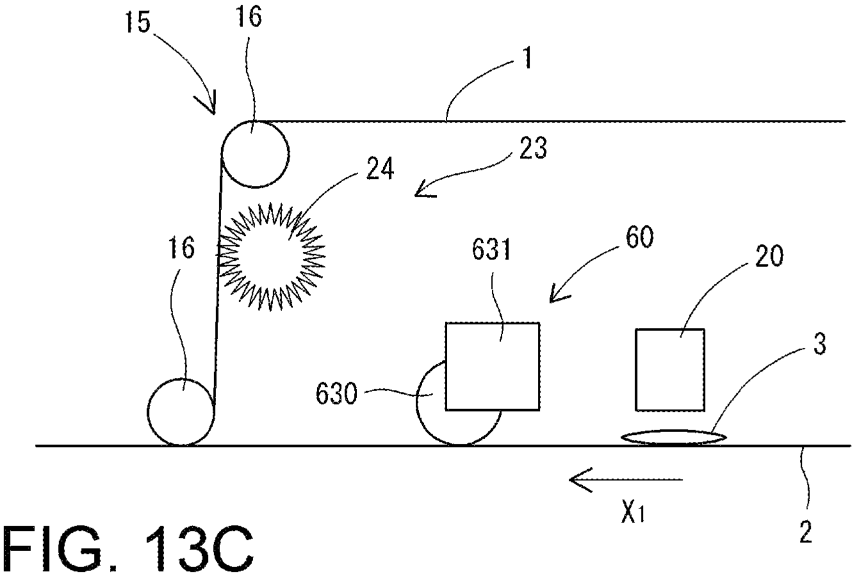
FIG. 13C illustrates a variation of FIG. 13A.

FIG. 13A and FIG. 13B illustrate yet another example of the dividing device 60. The dividing device 60 further includes a slitter 630 for the side gusset 3, which is disposed downstream of the temporary fix device 20 and upstream of the position where the panel webs 1 and 2 are superposed on each other. The slitter 630 is sandwiched and supported by the supports 631, and located with its tip slightly contacting the panel web 2. As the panel webs 1 and 2 are fed, the side gusset 3 temporarily fixed to the panel web 2 is slit along the perforations 25 by the slitter 630. As a result, the side gusset 3 is divided along the perforations 25, so that the pair of open edges 31 is formed. Dividing a side gusset 3 is repeated every intermittent feed cycle of the panel webs 1 and 2.

Where the slitter 630 is used, the perforations 25 may not be formed in the side gusset 3. The same can be applied to the following implementations. As illustrated in FIG. 13B, the dividing device 60 may further include elastic bodies 632 disposed on the opposite sides with respect to the slitter 630 and spaced from one another in the direction Y. Since the side gusset 3 has a cylindrical shape as illustrated in FIG. 4A, the failure to slit the side gusset 3 could occur. The elastic bodies 632 hold down the side gusset 3 on the opposite sides with respect to the slitter 630 during the slitting, thereby ensuring that the side gusset 3 is certainly slit. The slitter 630 may have angular cutting edges as illustrated in FIG. 13A, or a disc-shaped cutting edge as illustrated in FIG. 13C.

Other implementations will be described below. The same or similar components are indicated by the same numerals, and their explanations are omitted. The bag making apparatus in another implementation of FIG. 14 and FIG. 15 makes the bags 5 of FIG. 16A. The auxiliary gusset parts 12 of the bag 5 are formed at the opposite ends of each side gusset part 7. In addition, two end face parts 8 are provided, one of which serves as a bottom face part (which may be a bottom gusset) and the other of which serves as a top face part (which may be a top gusset).

Figure 14:
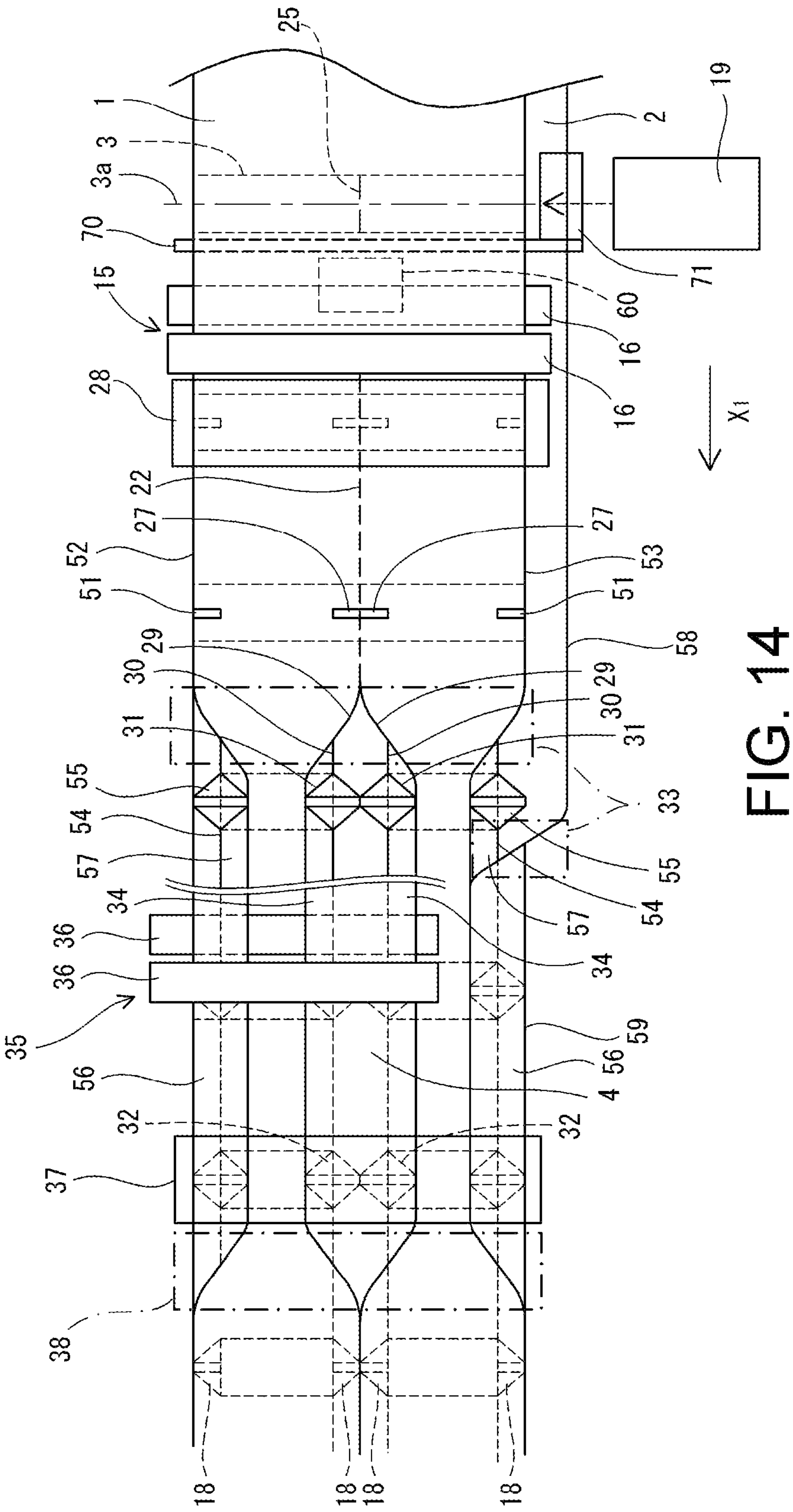
FIG. 14 is a schematic plan view of an upstream section of the bag making apparatus according to another implementation.
Figure 17A:
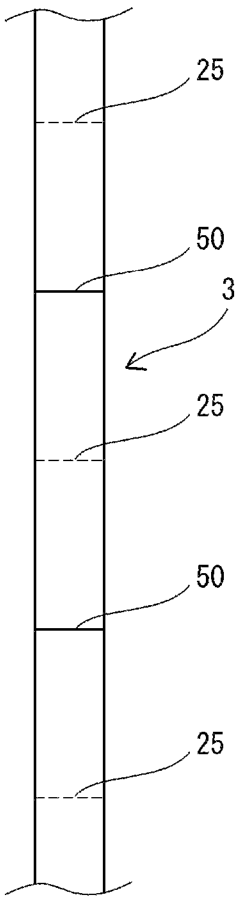
FIG. 17A illustrates a side gusset web.

As illustrated in FIG. 14, a side gusset 3 with no triangular flaps 46 (FIG. 1A) formed at the opposite ends of the side gusset 3 is fed to the panel web 2. For example, the side gusset feed device 19 supplies a side gusset web 3 as illustrated in FIG. 17A to the panel web 2, disposes it in the width direction of the panel webs 1 and 2, and then cuts it at a predetermined cutting position 50, for example by means of shearing, to locate one piece side gusset 3 on the panel web 2.

The dividing device 60 includes any one of the configurations exemplified above. The perforations 25 as the second line of weakness are formed in advance by the perforation cutter 26 (FIG. 5A or FIG. 5B) at the predetermined intervals in the side gusset web 3, as needed depending on the configuration of the dividing device 60. During every intermittent feed cycle of the panel webs 1 and 2, the dividing device 60 divides a side gusset 3 temporarily fixed to the panel web 2, to form a pair of open edges 31. The pair of open edges 31 is aligned with the perforations 22 when the panel webs 1 and 2 are superposed on each other.

The temporary seal device 28 seals the side gusset 3 to the panel webs 1 and 2 not only on the opposite sides with respect to the open edges 31 but also on the opposite ends of the side gusset 3 to form temporary sealed sections 51 in addition to the temporary sealed sections 27.

The first guide device 33 guides the panel web 1 in the same way as described in the above implementations to open the side gusset 3 at the open edges 31, thereby forming the open surfaces 32. The first guide device 33 further guides the panel web 1 as the panel webs 1 and 2 are fed, such that the panel web 1 is folded on the sides of the side edges 52 and 53 thereof along additional fold lines 54. This folding of the panel web 1 as well as the temporary sealed sections 51 cause the side gusset 3 to be opened, so that two open surfaces 55 are formed in addition to the open surfaces 32. The fold lines 54 extend in the longitudinal direction of the panel webs 1 and 2.

On the side of the side edge 52, the end face web supply device 35 supplies an additional end face web 56 as the panel webs 1 and 2 are fed, and disposes this web 56 on the panel web 1 (its additional folded parts 57) in the longitudinal direction of the panel webs 1 and 2 to superpose it on the folded parts 57 and the open surfaces 55.

The panel web 2 in the implementation is wider than the panel web 1 and protrudes by a certain distance from the side edge 53. The guide device 33 guides the panel web 2 such that the panel web 2 is folded on the side of the side edge 58 corresponding to the side edge 53 along a further additional fold line 59. This folded part of the panel web 2 serves as a further additional end face web 56, and this end face web 56 is superposed on the open surfaces 55 and the folded part 57 of the panel web 1 near the side edge 53. The fold line 59 extends in the longitudinal direction of the panel webs 1 and 2. This is the same as that in Patent document 2.

The open surface seal device 37 not only seals and thus adheres the end face web 4 to the open surfaces 32, but also seals and thus adheres the respective end face webs 56 to the open surfaces 55 on which they are superposed.

The second guide device 38 guides the panel web 1 as the panel webs 1 and 2 are fed, such that the panel web 1 is folded back along the two fold lines 54. This folding back of the panel web 1 causes the end face webs 56 to be folded in halves. In addition, this folding back of the panel web 1 causes the open surfaces 55 to be closed, so that the auxiliary gussets 18 are also formed at the opposite ends of the side gusset 3.

As in the side edge 53, on the side of the side edge 52, the panel web 2 may be folded in order to supply this folded part as the end face web 56. As in the side edge 52, on the side of the side edge 53, the end face web 56 which is separated from the panel web 2 may be supplied by the end face web supply device 35.

Figure 15A:
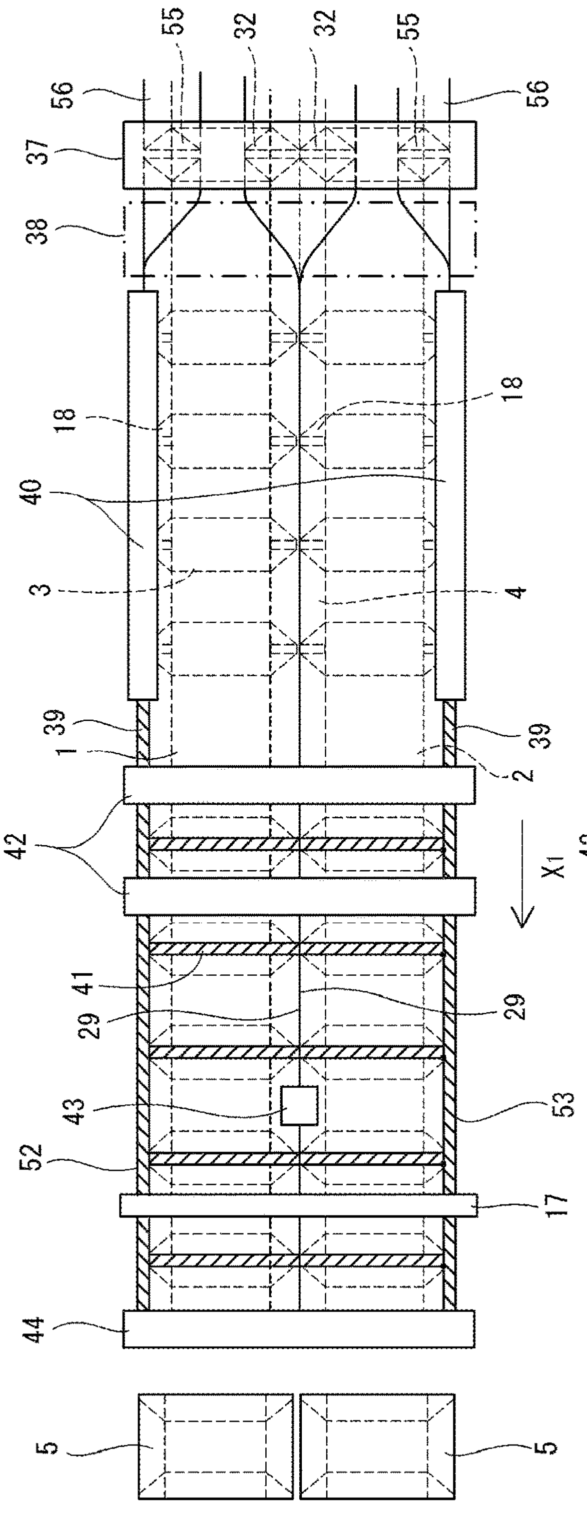
FIG. 15A is a schematic plan view of an example of a downstream section of the bag making apparatus in FIG. 14.

As illustrated in FIG. 15A, in the case of two-line bag making, the longitudinal seal device 40 does not heal-seal the end face web 4 along the pair of division edges 29. The longitudinal seal device 40 includes two pairs of heat seal bars, and heat-seals the additional end face webs 56 in the longitudinal direction of the panel webs 1 and 2 along the opposite side edges 52 and 53 of the panel web 1 to form the longitudinal sealed sections 39 during every intermittent feed cycle of the panel webs 1 and 2.

The cross seal device 42 heat-seals the side gusset 3 to the panel webs 1 and 2 and the end face webs 4 and 56 in the width direction of the panel webs 1 and 2 to form the cross sealed section 41 during every intermittent feed cycle of the panel webs 1 and 2.

As in the previous implementation, the slit device 43 slits the panel webs 1 and 2, the side gusset 3 and the end face web 4 along the pair of division edges 29 using the pair of slitters, and separates the margin (generated during this slitting) as a waste from the panel webs 1 and 2 using a winder.

The cross cut device 44 cross-cuts the panel webs 1 and 2, the side gusset 3 and the end face webs 4 and 56 in the position of the cross sealed section 41 in the width direction of the panel webs 1 and 2 using a cutter during every intermittent feed cycle of the panel webs 1 and 2, thereby making the bags 5. Two end face parts 8 are formed from the end face webs 4 and 56, wherein the end face web 4 becomes the bottom/top face part and the end face web 56 becomes the top/bottom face part. Since the end face part 8 formed from the end face web 4 has not been heat-sealed to the panel parts 6, either the bottom edge 10 or the top edge 11 serves as the open edge. In heat-sealing the open surfaces 32 and 55 using the longitudinal seal device 40, it is possible to select which edge is the open edge depending on whether this heat-sealing is performed with the open surface open or closed.

Figure 16A:
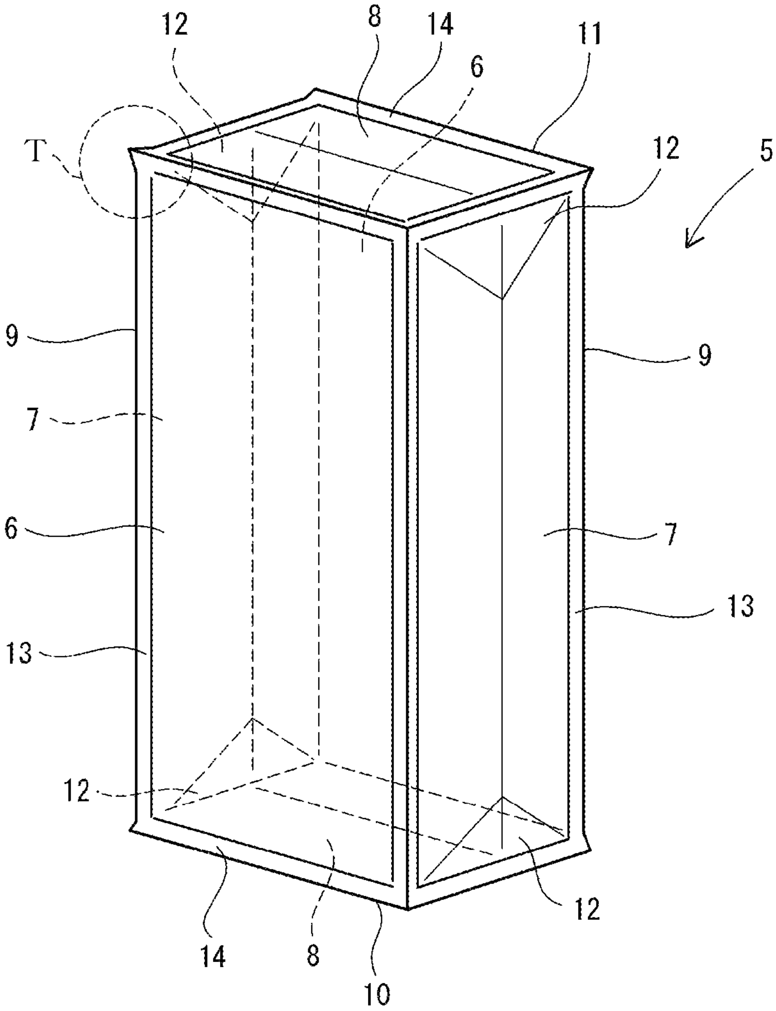
FIG. 16A illustrates another example of the bag.

In a subsequent step, the contents may be filled with the bag 5 through the open edge, and then the end face part 8 formed from the end face web 4 and the panel web 1 may be heat-sealed to each other along said open edge to form an additional second sealed section 14. FIG. 16A illustrates the bag 5 with the additional second sealed selection 14 which has been already formed.

Figure 15B:
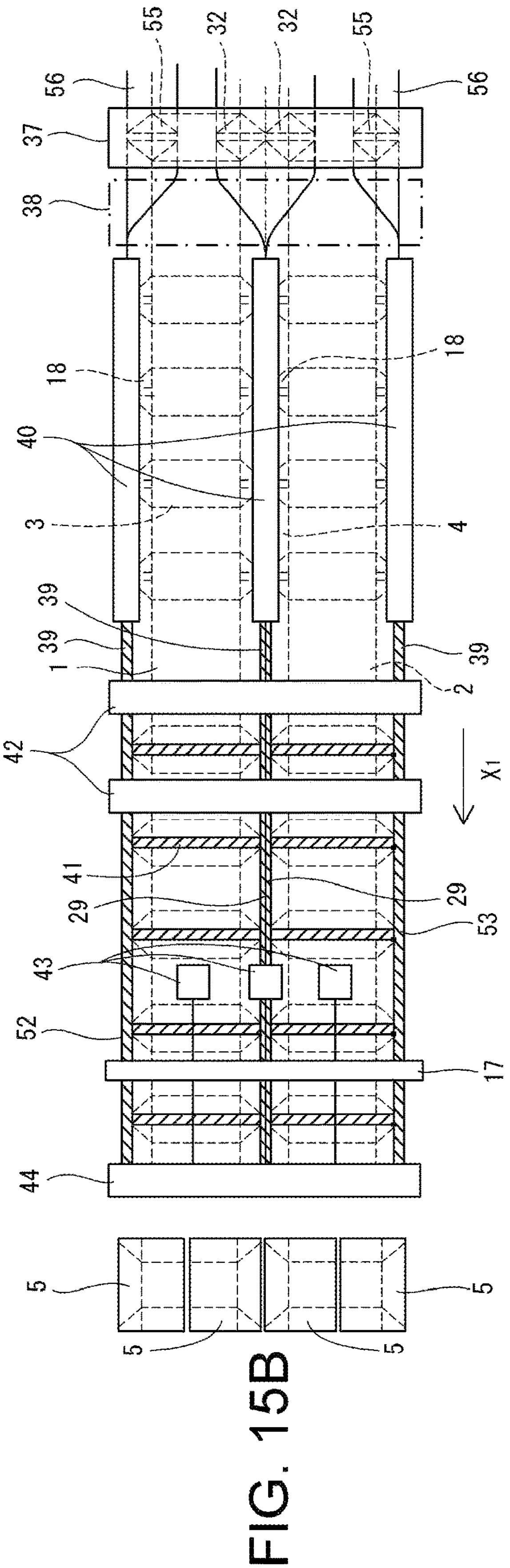
FIG. 15B is a schematic plan view of another example of a downstream section of the bag making apparatus in FIG. 14.

FIG. 15B illustrates a variation of the downstream section of the bag making apparatus. The longitudinal seal device 40 heat-seals the end face web 4 along the pair of division edges 29, and also heat-seals the end face web 56 along both side edges 52 and 53 of the panel web 1 to form the longitudinal sealed sections 39. For this purpose, the longitudinal seal device 40 in the implementation includes three pairs of heat seal bars.

The slit device 43 slits the panel webs 1 and 2, the side gusset 3 and the end face web 4 along the pair of division edges 29 (the central longitudinal sealed section 39), and slits the panel webs 1 and 2 and the side gusset 3 between the longitudinal sealed sections 39 next to one another. For this purpose, the slit device 43 in the implementation includes the slitters at three slitting positions.

Therefore, the four bags 5 are made every cross-cutting by the cross cut device 44. That is, the variation in FIG. 15B provides a four-line bag making. Each bag 5 does not have a top face part, but has a bottom face part (bottom gusset part).

Figure 18:
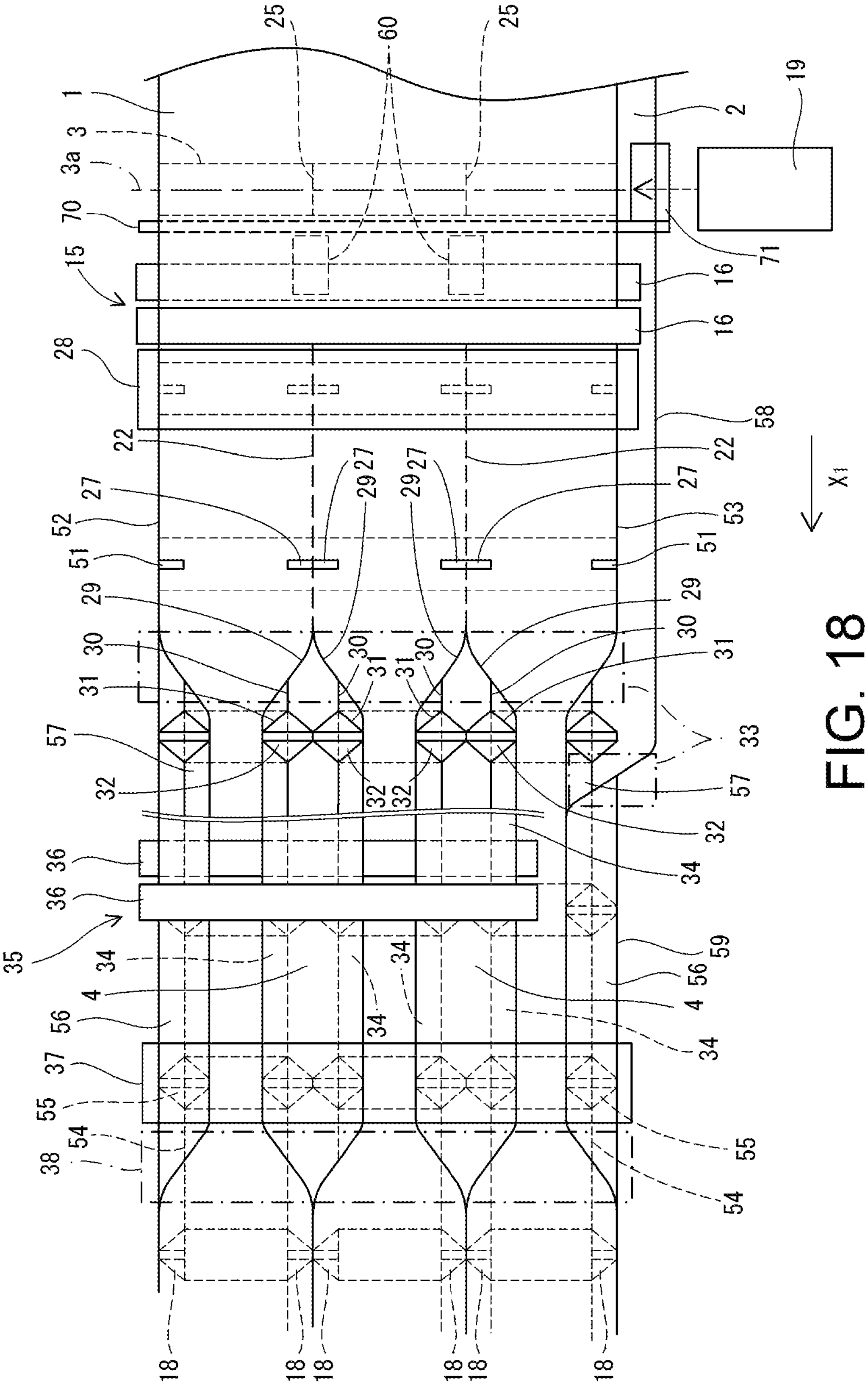
FIG. 18 is a schematic view of an upstream section of the bag making apparatus according to yet another implementation.

FIG. 18 partially illustrates a bag making apparatus for three-line bag making apparatus according to the implementation. Two lines of the perforations 22 as two first lines of weakness are formed in the panel web 1 to be spaced from one another in the width direction of the first panel web 1. Two lines of perforations 25 as two second lines of weakness are provided as needed depending on the configuration of the dividing device 60, and formed in the side gusset 3 to be spaced from one another in the longitudinal direction of the side gusset 3.

The dividing device 60 includes any of the configurations exemplified above at the respective positions for dividing the side gusset 3. The dividing device 60 divides the side gusset 3 into three (along the two lines of perforations 25) to form two pairs of open edges 31. When the panel webs 1 and 2 are superposed on each other, the two pairs of open edges 31 are aligned with the two lines of the perforations 22, respectively.

The first guide device 33 guides the panel web 1 to divide the panel web 1 into three along the two lines of perforations 22 and to fold the panel web 1 on the sides of the two pairs of division edges 29 along the fold lines 30. The first guide device 33 opens the side gusset 3 at the respective open edges 31 by utilizing the temporary sealed sections 27 and this folding of the panel web 1, to form two pairs of open surfaces 32.

The end face supply web device 35 supplies the two end face webs 4 to the panel web 1 as the panel webs 1 and 2 are fed, and disposes the end face webs 4 on the panel web 1 in the longitudinal direction of the panel webs 1 and 2 to superpose one end face web 4 on one pair of folded parts 34 and one pair of open surfaces 32, and the other end face web 4 on the other pair of folded parts 34 and the other pair of open surfaces 32. The second guide device 38 guides the panel web 1 to fold the panel web 1 back along the respective fold lines 30, and this folding back causes the respective end face webs 4 to be folded in halves on the opposite sides with respect to the longitudinal centerline thereof and also causes the respective open surfaces 32 to be closed so as to form four auxiliary gussets 18.

The opposite ends of the side gusset 3 and the opposite side edges 52 and 53 of the panel web 1 may be processed as desired in accordance with the design of the bags 5 to be made, not necessarily as illustrated in FIG. 18.

The subsequent steps are substantially the same as those in the previous implementations and therefore omitted. It is optional which edge is used as the open edge of the bags 5 by forming the longitudinal sealed section 39 (FIG. 2 and FIG. 14) along any of the division edges 29 and the edges 52 and 53.

It should be easily appreciated by those skilled in the art from the above implementations that multi-line bag making with four or more lines is also possible.

As can be seen from the above, multi-line bag making in each implementation eliminates the need for supplying the side gussets to the panel web at several times and disposing these side gussets in a single line in the width direction of the panel web. This reduces the time required for the step for supplying the side gusset and improves the production efficiency of bags each with an end face part.

If a single side gusset 3 is used in multi-line bag making, there will be a problem with the forming of the open surfaces 32 at the division edges 29 of the panel web 1. However, the implementations solve this problem by, after the temporary sealing, dividing the side gusset 3 and opening the side gusset 3 at the open edges 31 by means of the guiding of the panel web 1 to form the open surfaces 32. The panel web 1 is prevented from being torn along the first line of weakness 22 until it is guided by the first guide device 33. This facilitates and ensures the forming of the open surfaces 32. As a result, the made bags 5 are better finished.

After the forming of the open surfaces 32, the end face web 4 is supplied to the panel web 1 to be superposed on the open surfaces 32 of the side gusset 3. In two-line bag making of Patent document 1, the end face web (bottom gusset web) is placed on the upper surface of the upper panel web before the open surfaces are formed. In this case, the end face web acts as a resistance during the forming of the open surfaces and can interfere with the forming of the open surfaces. The present implementations also solve this problem of Patent document 1.

In the above implementations, the first and second lines of weakness 22 and 25 are not limited to perforations, but may be, for example, a plurality of micro-joints formed at appropriate intervals, or concave lines which have a thinner material thickness than the surrounding area and are thereby easier to be torn.

Figure 8C:
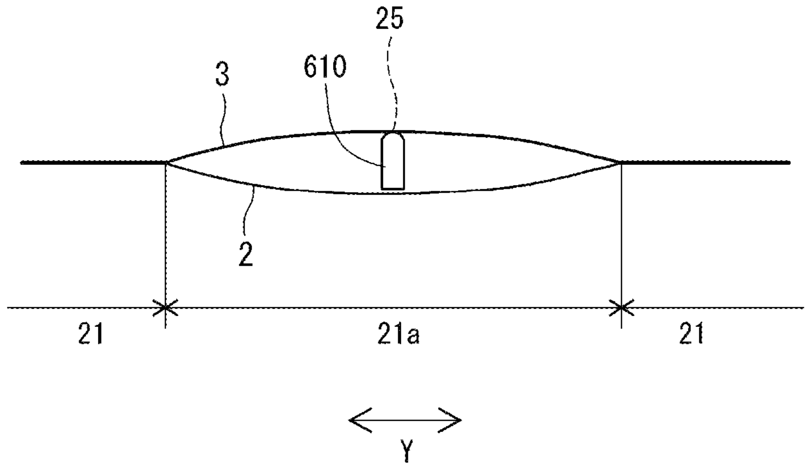

As an alternative, the dividing device 60 may insert a receiving plate between the panel web 2 and the side gusset 3 within the unwelded area 21*a* of FIG. 8C, and then irradiates the side gusset 3 with a laser beam from above of the side gusset 3 to fuse and cut the side gusset 3, thereby dividing the side gusset 3. The receiving plate is made of material non-transparent to the laser beam, and prevents the laser beam from reaching the panel web 2 and thus prevents the panel web 2 from being fused and cut by the laser beam.

Additional variations and additional configurations will be further described below.

The way of cutting the side gusset web 3 is not limited to shearing. For example, perforations may be formed in the cutting position 50 in FIG. 17A, and the side gusset feed device 19 grips the side gusset web 3 on the opposite sides with respect to the perforations using two clamps. Then, at least one of the clamps may be moved away from the other clamp to tear the side gusset web 3 along the perforations.

Figure 17B:
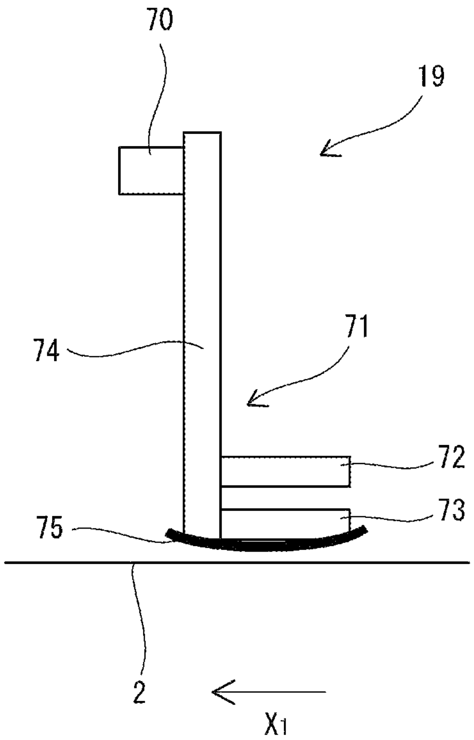
FIG. 17B is a side view of a transport unit that transports the side gusset web.

As illustrated in FIG. 14 and FIG. 18, the side gusset supply device 19 may include a guide 70 extending in the width direction of the panel webs 1 and 2, and a transport unit 71 disposed to be movable along the guide 70. FIG. 17B is a view of the transport unit 71 viewed from one side of the width direction of the panel webs 1 and 2. The transport unit 71 includes two claws 72 and 73, and a slider 74 that holds these claws 72 and 73 and is movable along the guide 70.

The transport device 71 releasably grasps the side gusset web 3 in FIG. 17A using the claws 72 and 73 by moving the upper claw 72 towards and away from the lower claw 73. The transport unit 71 transports and disposes the side gusset web 3 on the panel web 2 by moving the side gusset web 3 along the guide 70 while grasping the side gusset 3 using the claws 72 and 73. When the transport of the side gusset web 3 is completed, the temporary fix device 20 temporarily fixes the side gusset web 3 to the panel web 2 to form the temporary fixed section 21 (FIG. 4B).

As the claws 72 and 73 grasp the side gusset web 3 and transport it on the panel web 2, tension may be applied from the upstream side of the side gusset web 3. This prevents displacement of the side gusset web 3 during the supply of the side gusset web 3, and thus allows it to be disposed in an accurate position. Thereafter, the transport unit 71 returns to the stand-by position.

The transport unit 71 moves in the width direction of the panel webs 1 and 2 with respect to the panel web 2 and the side gusset 3, and the panel web 2 and the side gusset 3 move in the feed direction $X_1$ with respect to the transport unit 71. Therefore, the transport unit 71 may preferably have a downwardly convex, spherical crown-shape curved surface 75 at its lower end. This prevents the transport unit 71 from snagging on or damaging the panel web 2 or the side gusset 3.

For example, with regard to the timing of the feed of the panel webs 1 and 2 and the supply of the side gusset 3, the start of the feed of the panel webs, the stop of the feed of the panel webs, the supply of the side gusset, the temporary fix and the restart of the feed of the panel webs may be repeated. Also, the start of the feed of the panel webs, the supply of the side gusset, the stop of the feed of the panel webs, the temporary fix and the restart of the feed of the panel webs may be repeated. The latter is advantageous in terms of high-speed bag making.

Figure 16B:
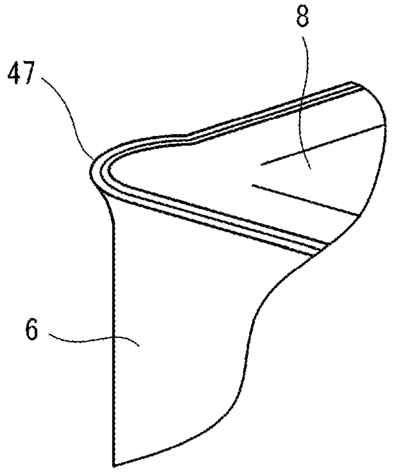
FIG. 16B is an enlarged perspective view of a region T in FIG. 16A.
Figure 16C:
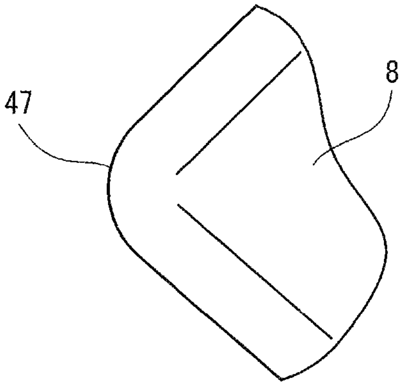
FIG. 16C is a plan view of the region T.

The bag making apparatus may punch the panel webs 1 and 2, the side gusset 3 and the end face web 4 (or 56) using a punch blade, Thomson blade, etc. (see, for example, FIG. 20), such that each of the bags 5 has round corner cut portions 47 to prevent injury, as illustrated in FIG. 16B and FIG. 16C. Such a configuration is well-known.

Figure 19:
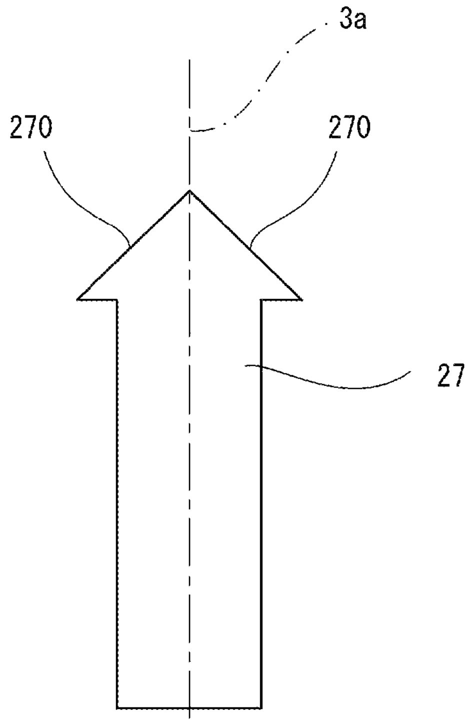
FIG. 19 illustrates a temporary sealed section.

The temporary sealed sections 27 (or 51) contribute to the forming of the open surfaces 32 (or 55) as described above. As illustrated in FIG. 19, the temporary sealed section 27, for example, may have a triangular shape, the tip portion of which includes two slant lines 270 and narrows toward the tip. Since creases are formed along the two slant lines 270 when the open surfaces 32 are formed, the resulting open surfaces 32 have clean finish. The slant lines of the auxiliary gusset part 12 of the bag 5 in FIG. 16A are the creases formed along the slant lines 270.

Figure 20A:
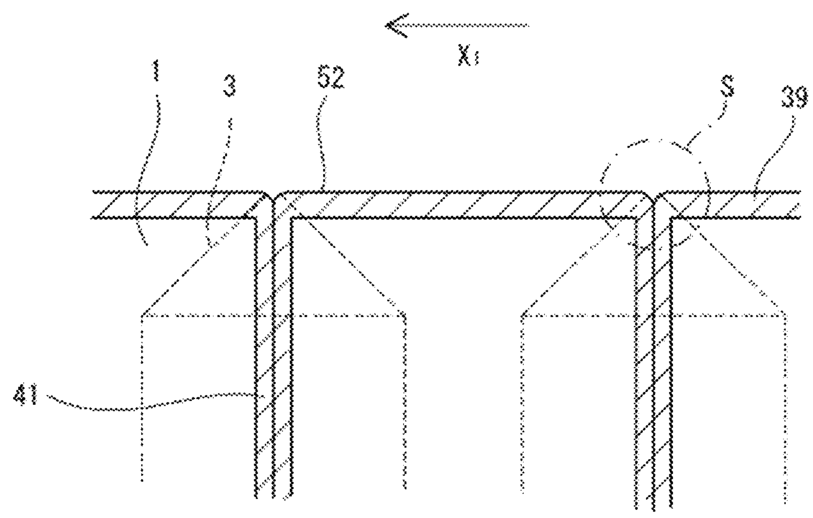
FIG. 20A illustrates a step for corner-cutting.
Figure 20B:
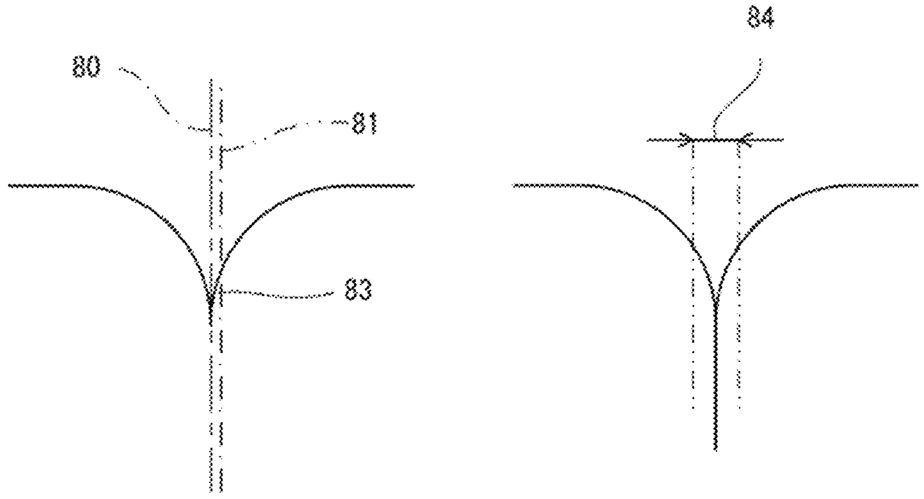
FIG. 20B is an enlarged view of a region S in FIG. 20A.

FIG. 20A illustrates a step for corner-cutting, and FIG. 20B illustrates the enlarged area S in FIG. 20A, including the corner-cut portion. As illustrated in FIG. 20B, even a slight deviation of the crosscut position 81 from the boundary line 80 of two bags adjacent to each other in the feed direction $X_1$ will result in a sharp protrusion 83 on one of the bags that may cause an injury. Therefore, during cross-cutting by the cross cut device 44, a margin 84 extending in the width direction of the panel webs 1 and 2 should be generated and then be discarded as a waste in order to prevent the protrusion 83 from being generated on the bag. The margin between two bags adjacent to each other in the width direction of the panel webs 1 and 2 is generated during slitting by the slitting device 43 and discarded as a waste, as described above.

Figure 21:
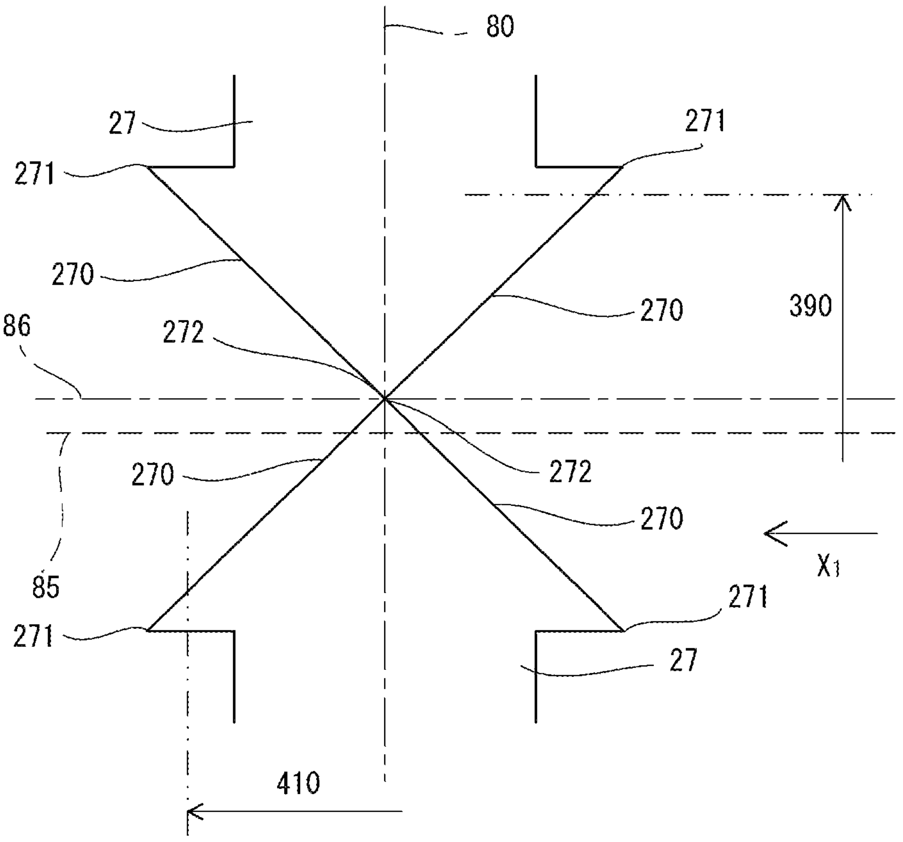
FIG. 21 illustrates a pair of temporary sealed sections.

FIG. 21 illustrates a pair of the temporary sealed sections 27 in the case where the margin 84 of FIG. 20B is not generated. If the actual division line 85 (the position where the perforations 22 are actually formed or to be formed) of the panel web 1 deviates from the designed division line 86 due to such as the meandering of the panel web 1, the division line 85 will deviate from the tip angle 272 of the temporary sealed sections to cross the tip of the pair of temporary sealed sections 27. As a result, the fold lines of the opening surfaces 32 may fail to be formed properly.

If the longitudinal heat-sealed area 390 is shifted due to meandering of the panel web 1 such that any of the corners 271 of the temporary sealed sections 27 is located outside the longitudinal heat-sealed area 390, the seal shape will be misshapen. Similarly, if any of the corners 271 is located outside of the horizontal heat-sealed area 410, the seal shape will also be misshapen.

Figure 22:
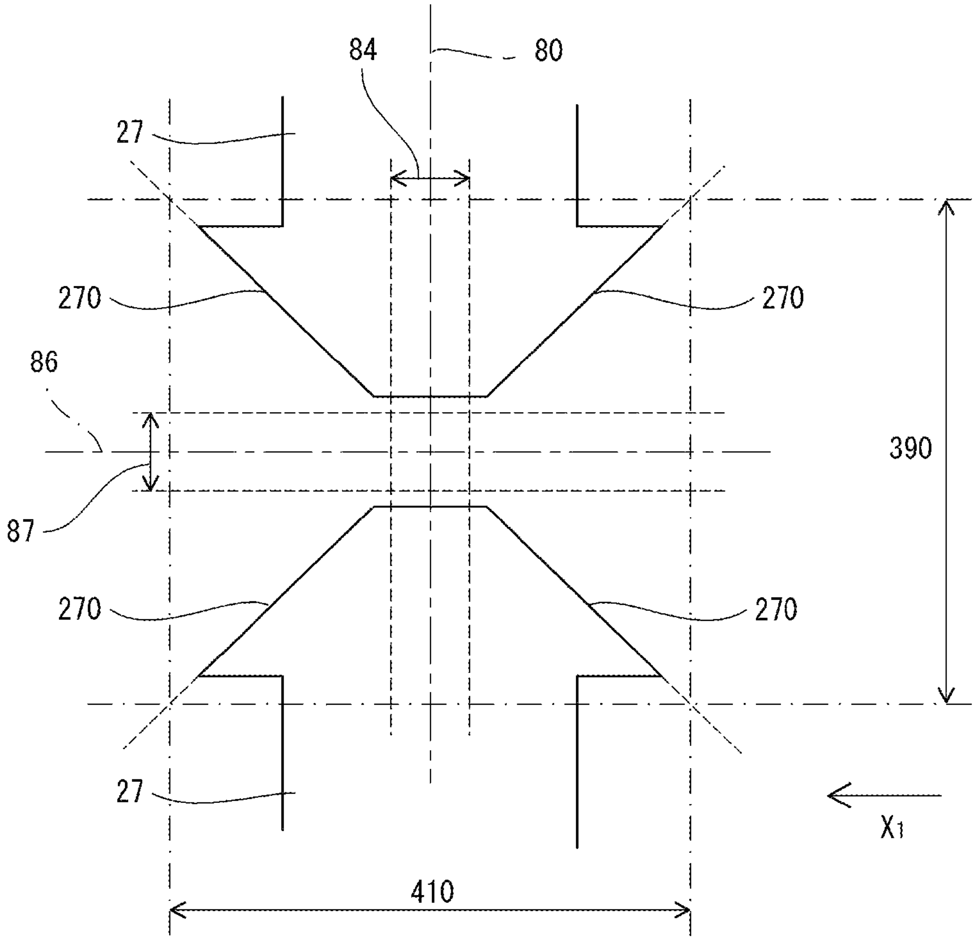
FIG. 22 illustrates another example of a pair of temporary sealed sections.

FIG. 22 illustrates a pair of temporary sealed sections 27 to avoid said problem. The tip portion of each temporary sealed section 27 is trapezoidal instead of triangular and are not included in the margin 87 which extends in the feed direction $X_1$ and will be formed by the slit device 43. This allows accurate creases to be formed from the slant lines 270 in forming the open surfaces 32. If the trapezoidal tip portion is fully included in both longitudinal and cross heat-seal areas 390 and 410, a proper seal shape is ensured. In particular, the intersection of the outer edges of the vertical and horizontal heat-sealed areas 390 and 410 is preferably located on the extension line of the slant line 270. This enhances the quality of the bags 5, and also their appearance and finish.

The size of the tip portion of the temporary sealed section 27 is appropriately determined based on the meandering of the panel webs 1 and 2, the accuracy of the intermittent feed, the widths of the margins 84 and 87, etc., such that the above requirements are met.

The invention claimed is:

1. A bag making apparatus comprising:

a panel web feed device superposes a first panel web and a second panel web on each other and feeds the first and second panel webs in a longitudinal direction of the first and second panel webs;

a side gusset supply device disposes a side gusset on the second panel web in a width direction of the second panel web before superposing of the first and second panel webs, wherein the side gusset is interposed between the first and second panel webs when the first and second panel webs are superposed on each other, the side gusset being folded in halves on opposite sides with respect to a longitudinal centerline thereof;

a temporary fix device temporarily fixes the side gusset to the second panel web on opposite sides with respect to a line of perforations of the side gusset before the superposing of the first and second panel webs to form an unadhered area where a part of the side gusset including the line of perforations is not adhered to the second panel web, the line of perforations extending in the width direction of the side gusset;

a dividing device divides the side gusset along the line of perforations se as to form open edges after temporary fixing of the side gusset and before the superposing of the first and second panel webs, wherein the open edges are aligned with a further line of perforations of the first panel web when the first and second panel webs are superposed on each other, the open edges extending in a width direction of the side gusset, the further line of perforations extending in the longitudinal direction of the first panel web;

a temporary seal device seals the side gusset to the first and second panel webs to form temporary sealed sections after the superposing of the first and second panel webs;

a guide device guides the first panel web as the first and second panel webs are fed, to divide the first panel web along the further line of perforations, to fold the first panel web on sides of division edges of the first panel web along fold lines, and to open the side gusset at the open edges for forming open surfaces, the fold lines extending in the longitudinal direction of the first panel web; and an end face web supply device disposes an end face web on the first panel web in the longitudinal direction of the first and second panel webs to superpose the end face web on folded parts of the first panel web and the open surfaces as the first and second panel webs are fed, the dividing device comprising:

a blade for tearing the side gusset along the line of perforations of the side gusset, wherein the blade is located downstream of the temporary fix device and upstream of a first position at which the panel web feed device superposes the first and second panel webs on each other, the blade having an elongated shape extending in a feed direction of the second panel web; and an actuator for positioning the blade at a second position where the blade enters between the side gusset and the second panel web in the unadhered area as the panel web feed device feeds the second panel web along a feed path, and for moving the blade from the second position in a direction away from the feed path when the blade is inserted in a longitudinal direction thereof at the second position through a gap formed between the side gusset and the second panel web.

2. The bag making apparatus of claim 1, wherein the dividing device further comprises two stoppers disposed on the opposite sides with respect to the blade and spaced from one another in the width direction of the second panel web to hold down the side gusset while the side gusset is torn along the line of perforations of the side gusset by the blade.

3. The bag making apparatus of claim 1, further comprising a perforation cutter having cutting teeth for forming the line of perforations in the side gusset before the side gusset supply device disposes the side gusset on the second panel web.

4. A bag making apparatus comprising:

a panel web feed device superposes a first panel web and a second panel web on each other and feeds the first and second panel webs in a longitudinal direction of the first and second panel webs;

a side gusset supply device disposes a side gusset on the second panel web in a width direction of the second panel web before superposing of the first and second panel webs, wherein the side gusset is interposed between the first and second panel webs when the first and second panel webs are superposed on each other, the side gusset being folded in halves on opposite sides with respect to a longitudinal centerline thereof;

a temporary fix device temporarily fixes the side gusset to the second panel web on opposite sides with respect to a line of perforations of the side gusset before the superposing of the first and second panel webs to form an unadhered area where a part of the side gusset including the line of perforations is not adhered to the second panel web, the line of perforations extending in the width direction of the side gusset;

a dividing device divides the side gusset along the line of perforations to form open edges after temporary fixing of the side gusset and before the superposing of the first and second panel webs, wherein the open edges are aligned with a further line of perforations of the first panel web when the first and second panel webs are superposed on each other, the open edges extending in a width direction of the side gusset, the further line of perforations extending in the longitudinal direction of the first panel web;

a temporary seal device seals the side gusset to the first and second panel webs to form temporary sealed sections after the superposing of the first and second panel webs;

a guide device guides the first panel web as the first and second panel webs are fed, to divide the first panel web along the further line of perforations, to fold the first panel web on sides of division edges of the first panel web along fold lines, and to open the side gusset at the open edges for forming open surfaces, the fold lines extending in the longitudinal direction of the first panel web; and an end face web supply device disposes an end face web on the first panel web in the longitudinal direction of the first and second panel webs to superpose the end face web on folded parts of the first panel web and the open surfaces as the first and second panel webs are fed, the dividing device comprising a stationary blade disposed downstream of the temporary fix device and upstream of a position at which the panel web feed device superposes the first and second panel webs on each other, the stationary blade having:

an upstream tip located at a position where the upstream tip enters between the side gusset and the second panel web in the unadhered area as the panel web feed device feeds the second panel web along a feed path, and a sloping edge for tearing the side gusset along the line of perforations of the side gusset as the second panel is fed along the feed path, wherein the sloping edge extends from the upstream tip to face in a direction away from the feed path and an upstream direction.

5. The bag making apparatus of claim 4, wherein the dividing device further comprises two stoppers disposed on the opposite sides with respect to the blade and spaced from one another in the width direction of the second panel web to hold down the side gusset while the side gusset is torn along the line of perforations of the side gusset by the sloping edge.

6. The bag making apparatus of claim 4, further comprising a perforation cutter having cutting teeth for forming the line of perforations on the side gusset before the side gusset supply device disposes the side gusset on the second panel web.

7. A bag making apparatus comprising:

a panel web feed device superposes a first panel web and a second panel web on each other and feeds the first and second panel webs in a longitudinal direction of the first and second panel webs;

a side gusset supply device disposes a side gusset on the second panel web in a width direction of the second panel web before superposing of the first and second panel webs, wherein the side gusset is interposed between the first and second panel webs when the first and second panel webs are superposed on each other, the side gusset being folded in halves on opposite sides with respect to a longitudinal centerline thereof, a temporary fix device temporarily fixes the side gusset to the second panel web on opposite sides with respect to a line of perforations of the side gusset before the superposing of the first and second panel webs to form an unadhered area where a part of the side gusset including the line of perforations is not adhered to the second panel web, the line of perforations extending in the width direction of the side gusset;

a dividing device divides the side gusset along the line of perforations se as to form open edges after temporary fixing of the side gusset and before the superposing of the first and second panel webs, wherein the open edges are aligned with a further line of perforations of the first panel web when the first and second panel webs are superposed on each other, the open edges extending in a width direction of the side gusset, the further line of perforations extending in the longitudinal direction of the first panel web;

a temporary seal device seals the side gusset to the first and second panel webs to form temporary sealed sections after the superposing of the first and second panel webs;

a guide device guides the first panel web as the first and second panel webs are fed, to divide the first panel web along the further line of weakness, to fold the first panel web on sides of division edges of the first panel web along fold lines, and to open the side gusset at the open edges for forming open surfaces, the fold lines extending in the longitudinal direction of the first panel web; and an end face web supply device disposes an end face web on the first panel web in the longitudinal direction of the first and second panel webs to superpose the end face web on folded parts of the first panel web and the open surfaces as the first and second panel webs are fed, the dividing device comprising:

a wire for tearing the side gusset along the line of perforations of the side gusset as the side gusset is fed together with the second panel web; and a support for supporting the wire, wherein the wire is inserted through a gap between the side gusset and the second panel web in the unadhered area when the side gusset is temporarily fixed to the second panel web, wherein the wire has a section located downstream of the temporary fix device and entering a feed path for the side gusset.

8. The bag making apparatus of claim 7, wherein the dividing device further comprises a hold down member disposed to hold down the side gusset on opposite sides with respect to the wire while the side gusset is torn along the line of perforations of the side gusset by the wire.

* * * * *